United States Patent [19]
Koyari et al.

[11] Patent Number: 5,419,740
[45] Date of Patent: May 30, 1995

[54] CONSTANT VELOCITY JOINT HAVING CENTERING DISK BEARING ECCENTRIC SOCKET

[75] Inventors: Sadayoshi Koyari; Masaharu Ohba, both of Aichi; Masatoshi Ito, Osaka, all of Japan

[73] Assignees: Toyota Jidosha Kabushiki Kaisha, Toyota; Koyo Seiko Co., Ltd., Osaka, both of Japan

[21] Appl. No.: 17,393

[22] Filed: Feb. 12, 1993

[30] Foreign Application Priority Data

| Mar. 16, 1992 | [JP] | Japan | 4-90251 |
| Dec. 15, 1992 | [JP] | Japan | 4-354091 |
| Dec. 15, 1992 | [JP] | Japan | 4-354092 |
| Dec. 15, 1992 | [JP] | Japan | 4-354093 |

[51] Int. Cl.⁶ .................................. F16D 3/26
[52] U.S. Cl. ........................ 464/118; 464/905
[58] Field of Search .............. 464/118, 117, 905

[56] References Cited

U.S. PATENT DOCUMENTS

| 2,953,001 | 9/1960 | Hufstander | 464/118 |
| 3,470,712 | 10/1969 | Geisthoff et al. | 464/905 |
| 4,257,243 | 3/1981 | Herchenbach | 464/905 |
| 4,464,136 | 8/1984 | Konrad et al. | 464/905 |

FOREIGN PATENT DOCUMENTS

| 48-3246 | 1/1973 | Japan. | |
| 50-21610 | 7/1975 | Japan. | |
| 2196719 | 5/1988 | United Kingdom | 464/117 |

*Primary Examiner*—Daniel P. Stodola
*Assistant Examiner*—Eileen A. Dunn
*Attorney, Agent, or Firm*—Cushman, Darby & Cushman

[57] ABSTRACT

In a constant velocity joint on the double Cardan type including a pair of flange yokes each having an annular flange portion and a pair of arm portions and connected together at the flange portions to define a radially inwardly open annular groove therebetween; a pair of pin yoke each having a connection end portion, a spherical end portion and a pair of arm portions connecting the connection end portion and the spherical end portion; a pair of cross pieces each pivotably connecting the pair of arm portions of each one of the flange yokes and the pair of arm portions of each one of the pin yokes in a manner of universal joint; and a centering disk bearing a socket portion for receiving the spherical end portions of the pair of pin yokes and slidably received in said annular groove at an outer peripheral portion thereof, the improvement is in that the socket portion of the centering disk is eccentrically shifted from a diametrical center of the centering disk, so that the centering disk is held from random rotation relative to the flange yokes.

21 Claims, 18 Drawing Sheets

CONSTANT VELOCITY JOINT HAVING CENTERING DISK BEARING ECCENTRIC SOCKET

BACKGROUND OF THE INVENTION

1. Field of the Invention

The present invention relates to a constant velocity joint of the double Cardan type, and more particularly to a constant velocity joint suitable for use in the steering system of a vehicle such as an automobile, wherein the break angle between the input and output rotary shafts of the joint is often relatively widely changed according to the option of the user.

2. Description of the Prior Art

As a constant velocity joint of the double Cardan type for connecting two rotary shafts in a torque transmitting relation with an angle of intersection, or break angle, between the central axes thereof, there is shown in Japanese Patent Publication 50-21610 a joint construction which comprises a pair of flange yokes each having an annular flange portion and a pair of arm portions and assembled together so that the annular flange portions flatly join one another with each pair of arm portions extending away from one another, a pair of pin yokes each having a connection end portion, a spherical end portion and a pair of arm portions connecting the connection end portion and the spherical end portion, a pair of cross pieces each pivotably connecting the arm portions of each one of the flange yokes and the arm portions of each one of the pin yokes in a manner of universal joint, a centering disk having a substantially circular disk body and a transverse socket portion provided at a diametrical center of the disk body for receiving the spherical end portions of the pair of pin yokes, and a pair of thin annular disks disposed at opposite sides of the centering disk so that outer peripheral portions of the centering disk is engaged in a radially inwardly open annular groove defined by the flange portions of the pair of flange yokes via the pair of thin annular disks to be in a sliding engagement with the inside wall surfaces of the annular groove.

In such a constant velocity joint, the spherical end portions of the pair of pin yokes are maintained in a transverse alignment by the socket portions of the centering disk, so that the joint operates at a higher velocity constancy than a double Cardan joint having no such centering disk. The pair of thin annular disks seal the inside space of the annular groove off from the environment, thereby preventing foreign materials such as dusts from entering into the annular groove.

However, in such a known constant velocity joint, since the socket portion is provided at the diametrical center of the body of the centering disk, the center disk can freely rotate around the central axis of the socket portion, so that the rotational position of the centering disk relative to the flange portions of the flange yokes is not determined. Further, the rotational position as well as the radial position of the thin annular disks relative to the centering disk and the annular flange portions of the flange yokes are not determined either. Therefore, the centering disk and the thin annular disks are liable to suffer irregular and uneven wearing, thereby causing a substantial deterioration of the velocity constancy of the joint after a certain period of use. Further, since the socket portion is aligned to the diametrical center of the centering disk, when the joint is operated with a relatively large angle of intersection, or break angle, between the axes of the input and output rotary shafts, the peripheral portion of the centering disk is diametrically shifted relative to the annular flange portions of the flange yokes, or the annular groove in which it is slidably disposed, to such a great extent that, when the diameter of the centering disk is relatively large as compared with the diameter of the annular flange portions of the flange yokes, the break angle of the joint is limited to be relatively small by a peripheral edge portion of the centering disk abutting a bottom portion of the annular groove, while when the diameter of the central disk is relatively small as compared with the annular flange portions of the flange yokes, a peripheral portion of the centering disk is exposed so much out of the annular groove that the centering action of the centering disk is substantially lost.

SUMMARY OF THE INVENTION

In view of the above-mentioned problems in the known constant velocity joint having the above-mentioned construction, it is the primary object of the present invention to provide a constant velocity joint of the same double Cardan type which is improved with respect to the above-mentioned problems.

According to the present invention, the above-mentioned object is accomplished by a constant velocity joint, comprising:

a pair of flange yokes each having an annular flange portion and a pair of arm portions and connected together at said flange portions to define a radially inwardly open annular groove therebetween;

a pair of pin yoke each having a connection end portion, a spherical end portion and a pair of arm portions connecting said connection end portion and said spherical end portion;

a pair of cross pieces each pivotably connecting said pair of arm portions of each one of said flange yokes and said pair of arm portions of each one of said pin yokes in a manner of universal joint; and a centering disk bearing a socket portion for receiving said spherical end portions of said pair of pin yokes and slidably received in said annular groove at an outer peripheral portion thereof;

wherein said socket portion of said centering disk is eccentrically shifted from a diametrical center of said centering disk.

By the construction that the socket portion of the centering disk is eccentrically shifted from the diametrical center of the centering disk, the centering disk is held from random rotation relative to the flange yokes by an outer peripheral portion of the centering disk contacting a bottom portion of the annular groove of the flange yokes, so that the wearing, when it occurs at the sliding contact portions of the side surfaces of the centering disk and/or the side wall surfaces of the annular groove, is theoretically foreseen and can be dealt with by appropriate counter measures.

In connection with the above-mentioned construction that an outer peripheral portion of the centering disk contacts the bottom of the annular groove of the flange yokes, it is a further object of the present invention to further improve the constant velocity joint of the above-mentioned construction so that an annular cushion layer is provided along a bottom of said annular groove.

Such an annular cushion layer may comprise a resin ring; a combination of a resin ring and a metal ring provided at the radially inside of said resin ring; a combination of at least one rubber O-ring and a metal ring provided at the radially inside of said O-ring; or a combination of an annular spring means having a sectional construction to provide a radial spring action and a metal ring provided at the radially inside of said annular spring. Such an annular cushion layer may also be provided by a layer of viscous fluid.

Or, an annular cushion layer may be provided along an outer periphery of said centering disk, wherein the annular cushion layer may comprise a resin ring.

Further, in connection with the above-mentioned construction that the relative rotation between the centering disk and the flange yokes along the annular groove is regularly determined, it is a still further object of the present invention to improve the constant velocity joint of the above-mentioned construction so that a pair of elastic compression layers are provided between opposite side surfaces of said centering disk and opposite side wall surfaces of said annular groove, whereby the wearing of the sliding contact surfaces as well as the friction force in the sliding engagement between the centering disk and the flange yokes along the annular groove are placed under the technical control.

Such elastic compression layers may comprise leaf springs each provided between the side surface of said centering disk and the mating side wall surface of said annular groove; or a combination of rubber O-rings each provided between the side surface of said centering disk and the mating side wall surface of said annular groove.

In other embodiments, such elastic compression layers may comprise compression coil springs each received in a bore formed in a side wall portion of said annular groove to extend transverse to the side wall surface of said annular groove and a bush member provided between an end of said compression coil spring and the mating side surface of said centering disk. In this case, an adjusting screw may be provided to adjust the spring force of said compression coil spring.

In still other embodiments, such elastic compression layers may comprise a pair of thrust bearings; or a combination of a wedge member and a radial compression coil spring biasing said wedge member in a radial direction of increasing a compression force acting between the side surface of said centering disk and the mating side wall surface of said annular groove due to a wedging action of said wedge member.

Further, the centering disk may be formed as a combination of disk halves each having a side wall surface contacting a mating side wall surface of said annular groove, and an elastic compression means is provided between said disk halves so as to elastically expand said disk halves toward respective mating side wall surfaces of said annular groove. In this case, said elastic compression means may comprise a wedge member and a radial compression coil spring biasing said wedge member in a radial direction of increasing a compression force acting between the side surface of said centering disk and the mating side wall surface of said annular groove due to a wedging action of said wedge member.

Further, the centering disk may include an elastically compressed portion elastically contacting the opposite side wall surfaces of said annular groove under the elasticity of itself.

Further, the centering disk may be formed as a combination of disk halves partially overlapped over one another so as to be sidewardly expandable to turn around a center of said socket portion relative to one another, and a biasing means biasing said disk halves toward an expanded condition.

As a further modification, a spring means may be provided at an outer peripheral portion of said centering disk to elastically abut against a bottom of said annular groove when said centering disk turns around a center of said socket portion relative to said flange yokes.

BRIEF DESCRIPTION OF THE DRAWING

In the accompanying drawings.

DESCRIPTION OF THE PREFERRED EMBODIMENTS

Figure 1:
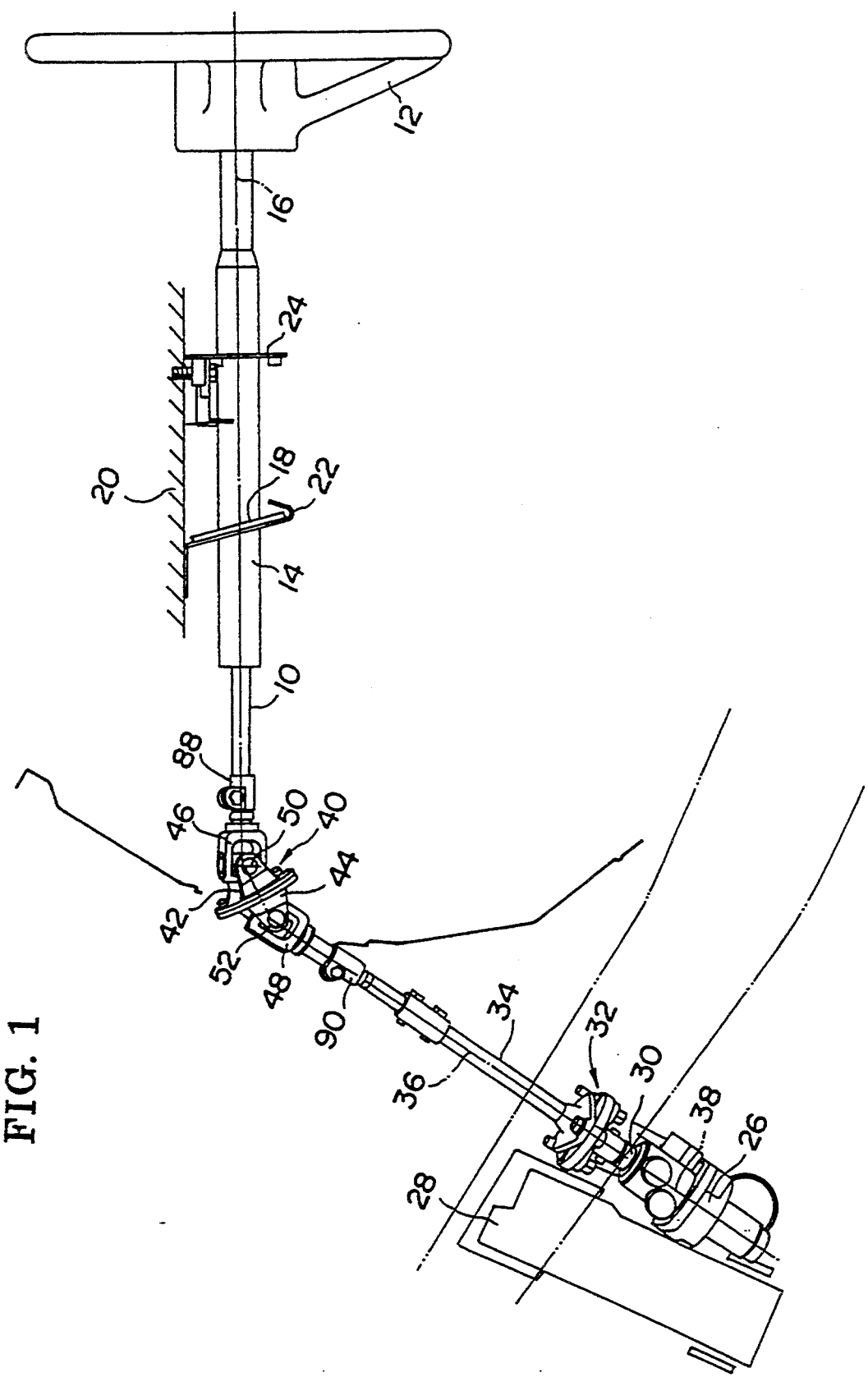
FIG. 1 is a somewhat perspective side view of a steering system of an automobile in which the constant velocity joint according to the present invention is incorporated in the form of an embodiment thereof.

Referring to FIG. 1, an upper shaft 10 supporting a steering wheel 12 is mounted to a body 20 of the vehicle by a tubular bearing housing 14 with its flange portion 18 fastened to the body by a bracket 22 and also with its flange portion 24 fastened to the body 20, so that the shaft 10 and the steering wheel 12 is rotatable about a central axis 16. A steering gear box 26 mounted to a suspension member 28 has a pinion gear shaft 30 connected with a lower end of a lower shaft 34 by a conventional elastic joint 32. The lower shaft 34 has a length adjustable along its axis 36 and is substantially aligned with the pinion gear shaft 30 having an axis 38.

An upper end of the lower shaft 34 is connected with a lower end of the upper shaft 10 by the constant velocity joint 40 according to the present invention so that torque and rotation are transmitted therebetween while maintaining the constancy of rotation speed. The constant velocity joint 40 comprises, as shown in more detail in FIGS. 2-5, a pair of flange yokes 42 and 44, a pair of pin yokes 46 and 48, a pair of cross pieces 50 and 52, and a centering disk 54.

The flange yokes 42 and 44 have annular disk-like flange portions 42A and 44A substantially symmetrical about central axes 56 and 58, respectively, and arm portions 42B and 44B extending from the corresponding flange portions along the corresponding axes 56 and 58, respectively. The flange yokes 42 and 44 are assembled together with the axes 56 and 58 being aligned with one another and with the arm portions 42B and 44B being oriented in the same angular position around the common axis 56-58, by a plurality of fastening bolts 60 and nuts 62 arranged along the peripheries of the flange portions 42A and 44A. However, in FIGS. 2 and 3, for the purpose of illustration, the flange yokes 42 and 44 are shown in an imaginary condition, wherein the flange yokes 42 and 44 are turned 90 degrees relative to one another about the common axis 56-58 so that the arm portions 42B and 44B, independently the same in the construction, and the related construction members of the joint are illustrated in two different views perpendicular to one another.

The arm portions 42B and 44B are formed with bores 64 and 66, respectively, having axes 68 and 70 which cross the axes 56 and 58 at points Pa and Pb, respectively.

The pair of pin yokes 46 and 48 have connection end portions 46A and 48A having axes 72 and 74 which pass the points Pa and Pb in the assemblage, respectively, and spherical end portions 46B and 48B provided at other ends opposite to the connection end portions 46A and 48A in alignment with the axes 72 and 74, respectively. The spherical end portions 46B and 48B are integrally connected with the connection end portions 46A and 48A by a pair of arm portions 46C and 48C, respectively. The arm portions 46C and 48C are formed with transverse bores 76 and 78 each formed in pair, respectively, each pair of bores 76 and 78 being aligned with one another along respective common axes 80 and 82 intersecting with the axes 72 and 74 at the points Pa and Pb, respectively. The connection end portions 46A and 48A are formed with bores 84 and 86 aligned with the axes 72 and 74, respectively, into which connection members 88 and 90 (FIG. 1) are inserted and fastened therein by welding, and the corresponding end portions of the upper shaft 10 and the lower shaft 34 are inserted into the connection members 88 and 90 to be fastened thereto, respectively.

The pair of cross pieces 50 and 52 are provided to interconnect the flange yokes 42 and 44 with the pin yokes 46 and 48, respectively, with a pair of stub portions 50A and 52A being rotatably engaged into the bores 64 and 66 of the arm portions 42B and 44B of the flange yokes 42 and 44, while a pair of stub portions 50B and 52B being rotatably engaged into the bores 76 and 78 of the arm portions 46C and 48C of the pin yokes 46 and 48. In such an assembly, the flange yoke 42 and the pin yoke 46 are connected with one another via the cross piece 50 so as to be pivotable about the point Pa in the manner of universal joint, while the flange yoke 44 and the pin yoke 48 are connected with one another via the cross piece 52 so as to be pivotable about the point Pb in the same manner of universal joint.

The flange yokes 42 and 44 define in combination an annular groove 92 extending along a center plane 98 perpendicular to the common axis 56-58, said annular groove being diametrically centered at the common axis 56-58 and opened radially inwardly. The centering disk 54 is provided with an outer peripheral portion thereof being received in the annular groove 92 in a substantially tight but slidable engagement.

Figure 2:
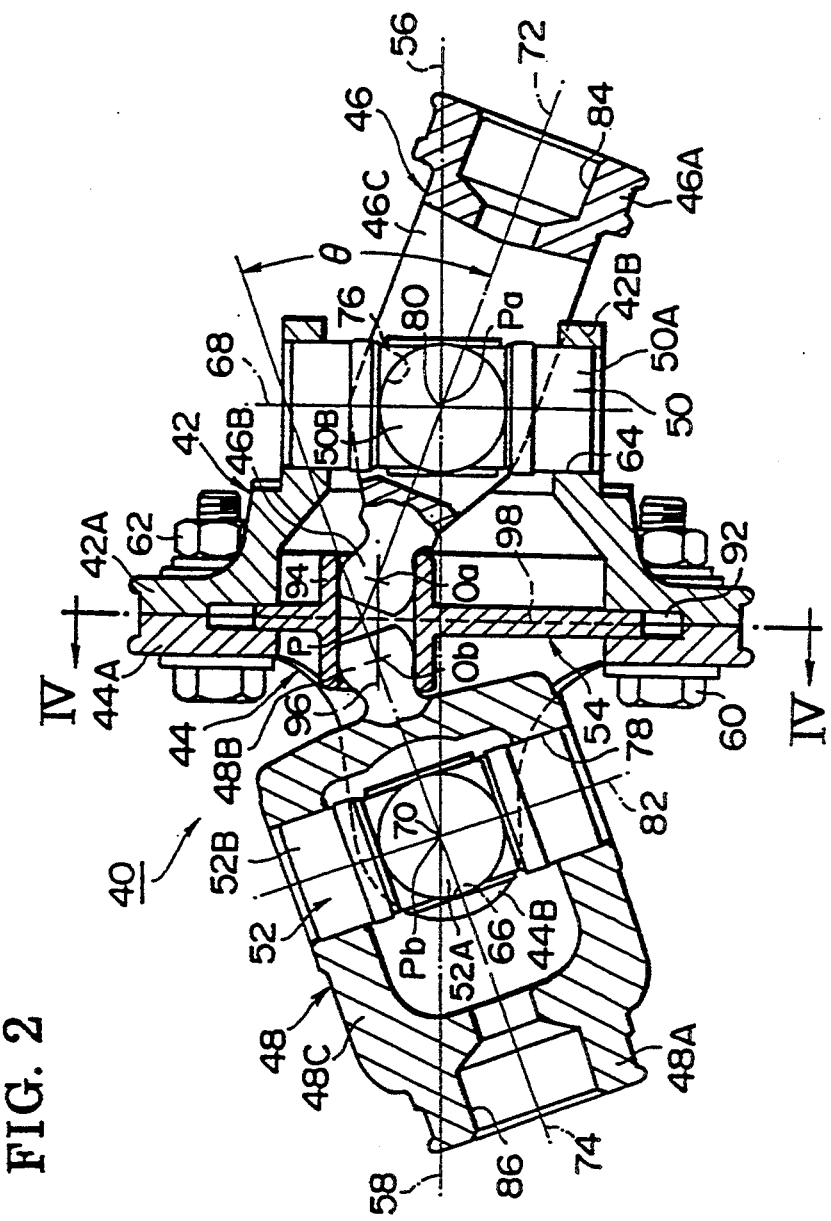
FIG. 2 is a longitudinally sectional view of the constant velocity joint shown in FIG. 1, enlarged in the scale as compared with FIG. 1, showing the joint in a condition wherein the break angle of the joint is relatively small.
Figure 3:
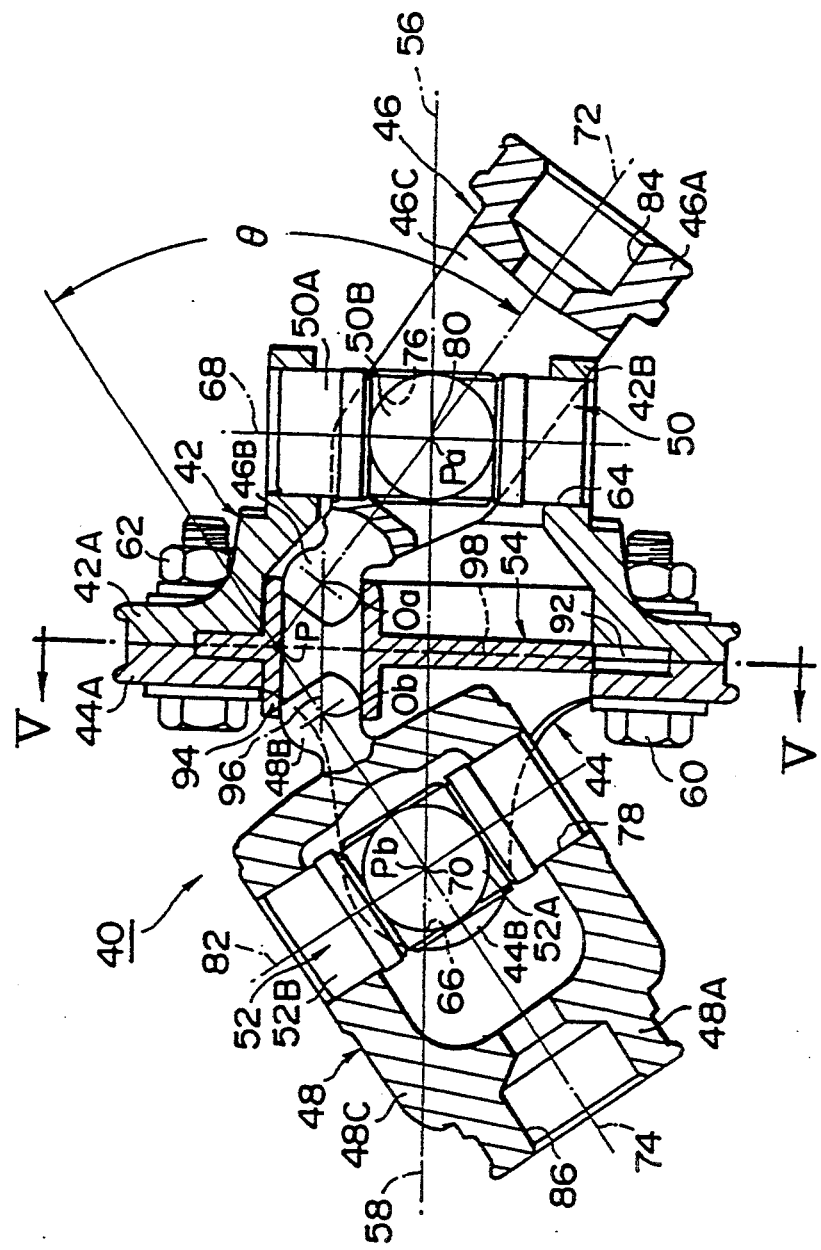
FIG. 3 is a view similar to FIG. 2, showing the joint in a condition wherein the break angle of the joint is relatively large.

The centering disk 54 has a substantially circular disk body and a socket portion 94 adapted to closely but pivotably receive the spherical end portions 46B and 48B of the pin yokes 46 and 48. As is apparent from FIGS. 2-5, the socket portion 94 is provided in the centering disk 54 at a position eccentrically shifted from its diametrical center point so that, when the spherical end portions 46B and 48B of the pin yokes 46 and 48 are shifted from the common axis 56-58 in one radial direction so as to provide a standard break angle $\Theta$ such as shown in FIG. 2, the circular disk body of the centering disk 54 is positioned in a substantial center alignment with the flange portions 42A and 44A of the flange yokes 42 and 44, and when the centering disk 54 is shifted in the radial direction until a corresponding peripheral edge portion of the circular disk body of the centering disk 54 engages a corresponding bottom portion of the annular groove 92 as shown in FIGS. 3 and 5, so as to provide a maximum break angle $\Theta$ between the upper shaft 10 and the lower shaft 234, no peripheral portion of the circular disk body of the centering disk 54 disengages from the annular groove 92.

The point of intersection Pa of the axes 68 and 80 and the point of intersection Pb of the axes 70 and 82 are positioned to be equally distant from the plane 98 along which the flange portions 42A and 44A are abutted to one another. The centers Oa and Ob of the spherical end portions 46B and 48B are also positioned to be equally distant from the plane 98. According to these conditions, the point of intersection P of the axes 72 and 74 is always positioned in the plane 98 throughout the movement of the joint from the condition shown in FIG. 2 wherein the break angle $\Theta$ between the axes 72 and 73 is relatively small to the condition shown in FIG. 3 wherein the break angle $\Theta$ is the maximum.

In the shown embodiment, when the steering wheel 12 is turned for steering so that the upper shaft 10 is correspondingly rotated about the axis 16, the rotation of the upper shaft 10 is transmitted to the pin yoke 46 through the connection member 88, whereby the pin yoke 46 is correspondingly rotated about the axis 72. The rotation of the pin yoke 46 is transmitted to the flange yoke 42 via the cross piece 50 so that the flange yokes 42 and 44 rotate as a hole about the common axis 56–58. The rotation of the flange yoke 44 is transmitted to the pin yoke 48 via the cross piece 52 so that the cross piece 52 is correspondingly rotated about the axis 74. The rotation of the pin yoke 48 is transmitted through the connection member 90 to the lower shaft 34 so that it rotates about the axis 36. The rotation of the lower shaft 34 is transmitted to the pinion gear shaft 30 via the elastic joint 32 so that the pinion gear shaft 30 is rotated about the axis 38.

When the pinion gear shaft 30 is rotated by a torque inversely applied thereto from the side of the steering gear box 26, the rotation of the pinion gear shaft 30 is transmitted inversely through the above-mentioned rotation transmission system so as finally to rotate the steering wheel 12.

According to the conditions that the center points Oa and Ob of the spherical end portions 46B and 48B are maintained to be equally distant from the common axis 56–58 and the center points Oa and Ob as well as the points Pa and Pb are respectively maintained to be equally distant from the center plane 98 regardless of changes of the break angle Θ, the constancy of rotation velocity is maintained between the pin yokes 46 and 48.

Figure 25:
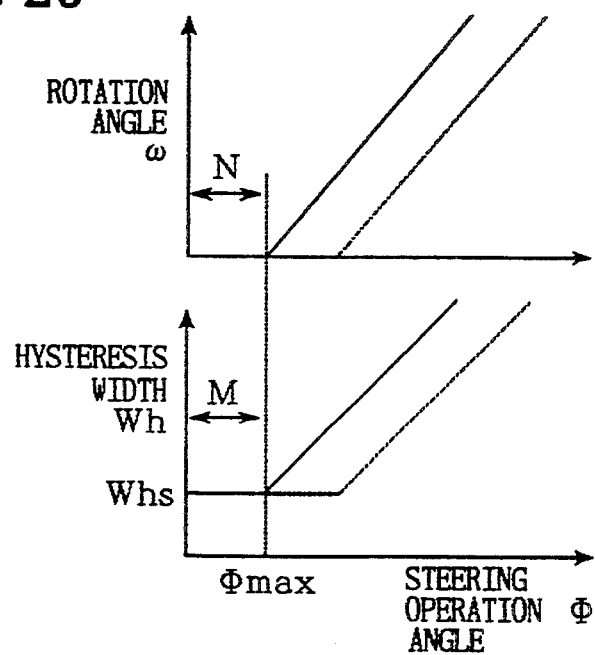
FIG. 25 is a diagram of steering operation angle versus hysteresis width and rotation angle.

The outer peripheral portion of the centering disk 54 is always in a close sliding contact with the wall surfaces of the annular groove 92, and according to the present invention the relative position of the centering disk 54 with respect to the flange yokes 42 and 44 is definitely maintained in a design condition. In other words, when the pin yoke 46 is rotated by the driver turning the steering wheel 12 in the anti-clockwise direction, or the yoke 48 is rotated in the clockwise direction as viewed from the side of the steering gear box 26 by the force applied from the road surface to the steering vehicle wheel, the centering disk 54 is, if it was initially at the position shown in FIG. 4, it first rotates around the axis 96 by following the flange yokes 42 and 44 which rotate around the common axis 56–58, but soon the centering disk 54 abuts against the bottom of the annular groove 92 at a peripheral edge portion thereof as shown by X in FIG. 6, and the centering disk 54 no longer rotates beyond a fraction of 360 degrees. When the flange yokes 42 and 44 rotate further around the common axis 56–58, the center of the socket portion 94 moves, relative to the flange yokes 42 and 44, around the common axis 56–58 as shown in FIG. 25, by drawing a circle trace 180, while the outer circumference of the centering disk 54 sliding along the bottom of the annular groove 92 at the contact point X. When the direction of steering is reversed, or the torque transmitted from the steering vehicle wheel reverses, a similar new contact between the centering disk 54 and the bottom of the annular groove 92 occurs at a point symmetrical to the point X with respect to a center line drawn through the points 96 and 58 in FIG. 6. Therefore, the sliding condition between the peripheral portion of the centering disk 54 and the opposite side wall surfaces of the annular groove 92 changes according to a determinate regular cycle, so that, when a wear occurs at the sliding surfaces, it occurs in an expected regular pattern, and it is avoided that an uneven causally heavy wearing occurs at a particular portion of the centering disk 54 and/or the side wall surfaces of the annular groove 92. Further, since the circular disk body of the centering disk 54 is generally aligned to the center of the annular flange portions of 42A and 44A of the flange yokes 42 and 44 at and around the standard operating condition of the steering system, with the socket portion 94 being eccentrically shifted from the common axis 56–58 by a certain design distance, a sealing overlap between the annular peripheral portion of the circular disk body of the centering disk 54 and the side walls of the annular groove 92 is uniformly maintained all along the annular groove 92, whereby invasion of foreign materials such as dusts into the annular groove is effectively prevented. Further, with the socket portion 94 being eccentrically shifted from the diametrical center of the circular disk portion of the centering disk 54 corresponding to the break angle between the pin yokes 46 and 48 at a standard operating condition of the joint, a relatively large break angle such as 40–70 degrees is available without increasing the outer diameter of the flange portions 42A and 44A of the flange yokes 42 and 44. Further, since the centering disk 54 does not come out of engagement with the annular groove 92 at any peripheral portion thereof in the wide range of variation of the break angle around the standard design break angle, such thin annular disks as required in Japanese Patent Publication 50-21610 are no longer required.

When the vehicle travels on a rough road, transverse forces are applied to the steering vehicle wheels in the directions to turn them in left and right steering directions. Such transverse forces applied to the steering vehicle wheels are inversely transmitted through the steering suspension mechanism to generate oscillating torques in the pinion gear shaft 30 which are transmitted through the lower shaft 34 to the pin yoke 48. By such oscillating torques the spherical end portion 48B is biased in transverse directions perpendicular to the paper sheet of the drawing of FIG. 2 relative to the spherical end portion 46B. According to such forces, or a couple of forces, the centering disk 54 is biased to turn about an axis which is a line of intersection of the center plane 98 and the paper sheet of FIG. 2. Further, the oscillating forces applied to the steering vehicle wheels from a rough road are also transmitted through the steering suspension mechanism, the steering gear box 26, the pinion gear shaft 30 and the lower shaft 34 in its axial direction so as to bias the spherical end portion 48B upward in FIG. 2 relative to the spherical end portion 46B. Such a force, or a couple of force, would turn the centering disk 54 about an axis erected on the paper sheet of FIG. 2 perpendicularly thereto through a point of intersection of the common axis 56–58 and the center plane 98. According to these transverse forces, since there is a small clearance between the side wall surfaces of the centering disk 54 and the side wall surfaces of the annular groove 92 for the sliding engagement therebetween, the side wall surfaces of the centering disk 54 are repetitively struck against the opposite side wall surfaces of the annular groove 92. If the clearance between the side wall surfaces of the centering disk 54 and the opposing side wall surfaces of the annular groove 92 increases as a result of such a transverse vibration of the centering disk 54 relative to the annular groove 92, the constancy of rotation velocity of the joint and therefore the quality of the steering system will be damaged.

If the contact between the outer periphery of the centering disk 54 and the bottom of the annular groove 92 at the above-mentioned point X occurs as a direct contact of the two metal members as in the embodiment shown in FIGS. 2–5, there would occur a percussion noise and/or an unpleasant feeling in the operation of the steering wheel, particularly when it occurs impulsively.

Figure 8:
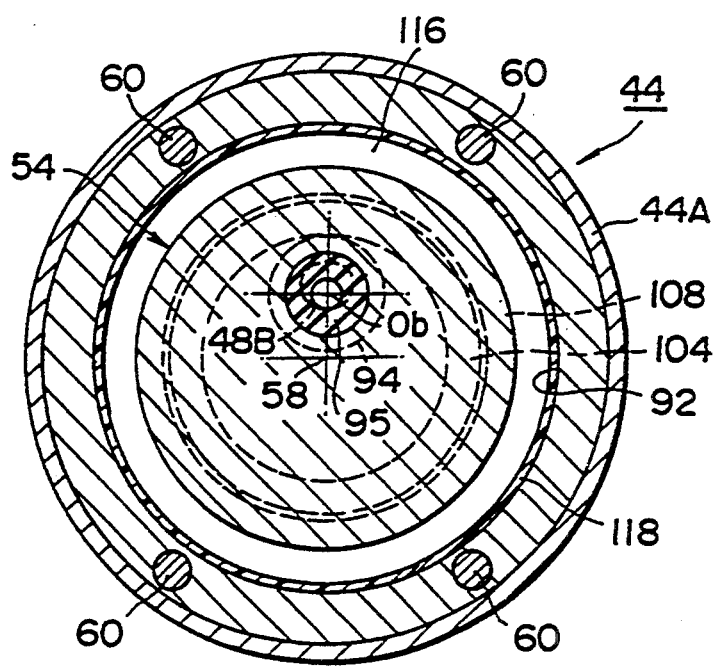
FIG. 8 is a transverse sectional view along line VIII—VIII in FIG. 6.
Figure 7:
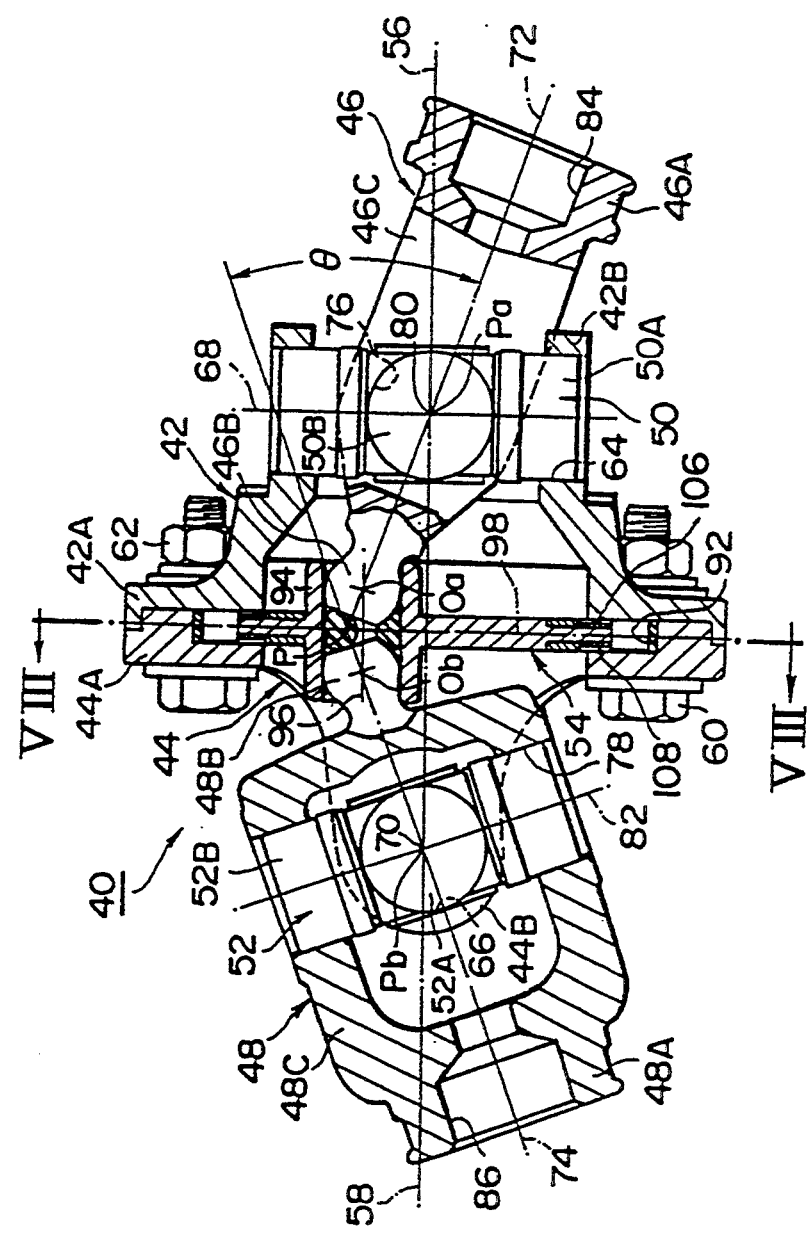
FIG. 7 is a longitudinally sectional view similar to FIG. 2, showing a further improved embodiment of the constant velocity joint according to the present invention.
Figure 9:
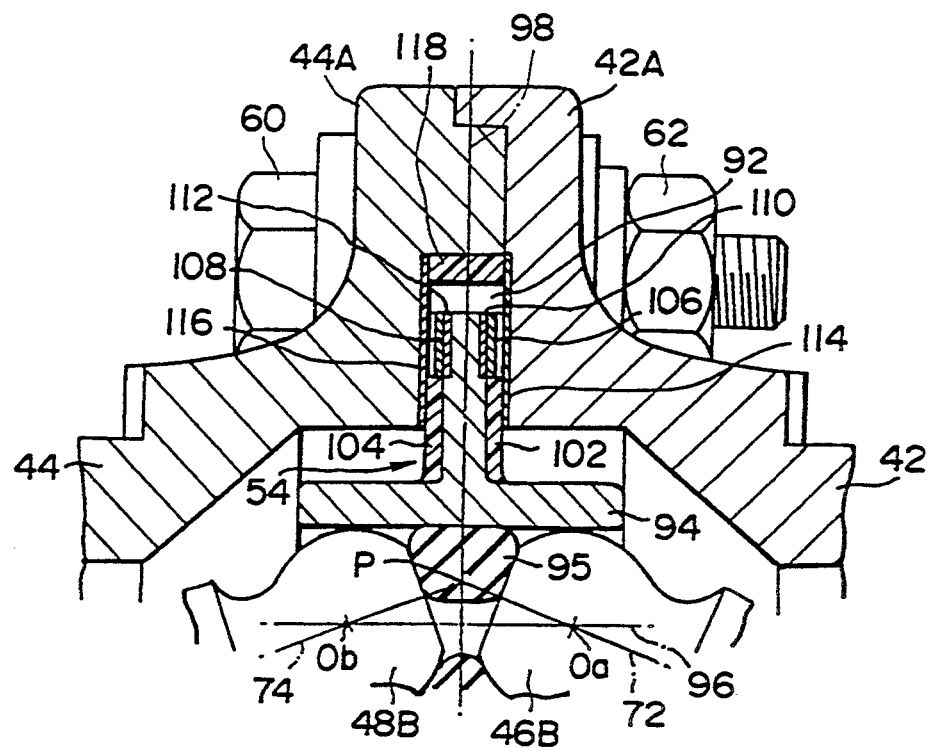
FIG. 9 is a view showing a part of FIG. 7 in more detail at a larger scale.

FIGS. 7 and 8 are longitudinal and transverse sectional views similar to FIGS. 2 and 3, showing another embodiment of the constant velocity joint according to the present invention improved further from the embodiment shown in FIGS. 2–5 in view of the above-mentioned problems. In FIGS. 7 and 8, the portions corresponding to those shown in FIGS. 2–5 are designated by the same reference numerals. Further, the essential portion of the improvement is shown in FIG. 9 in more detail. In this embodiment, resin layers 102 and 104 are provided on opposite side surfaces of the annular peripheral portion of the centering disk 54. Further, along the outer peripheral portion of the centering disk 54 there are provided washers 110 and 112 and annular leaf springs 106 and 108. On the opposite side wall surfaces of the annular groove 92 there are provided washers 114 and 116 to oppose the resin layers 102 and 104 and the leaf springs 106 and 108. The leaf springs 106 and 108 may each be a washer spring having corrugations in the peripheral or radial direction, and operate to elastically center the outer peripheral portion of the centering disk against the side wall surfaces of the annular groove 92. The leaf springs 106 and 108 provide elastic compression layers provided between the opposite side surfaces of the centering disk 54 and the opposite side wall surfaces of the annular groove 92 for axially centering the centering disk relative to the annular groove 92 or the flange yokes 42 and 44 even when a certain wearing has occurred at the sliding side surfaces of the centering disk and/or the mating side wall surfaces of the annular groove. Further, a cylindrical resin ring 118 is provided in the annular groove 92 to form an annular resin layer along the bottom wall of the annular groove 92. Further, a rubber bush 95 is provided between the spherical end portions 46B and 48B in the inside space of the socket portion 94, the rubber bush 95 being an annular member extending around an axis 96.

FIGS. 10–18 are views similar to FIG. 9, showing other variation embodiments with respect to the improvement about the engagement structure between the centering disk 54 and the annular groove 92. In these figures the portions corresponding to those shown in FIG. 9 are designated by the same reference numerals.

Figure 10:
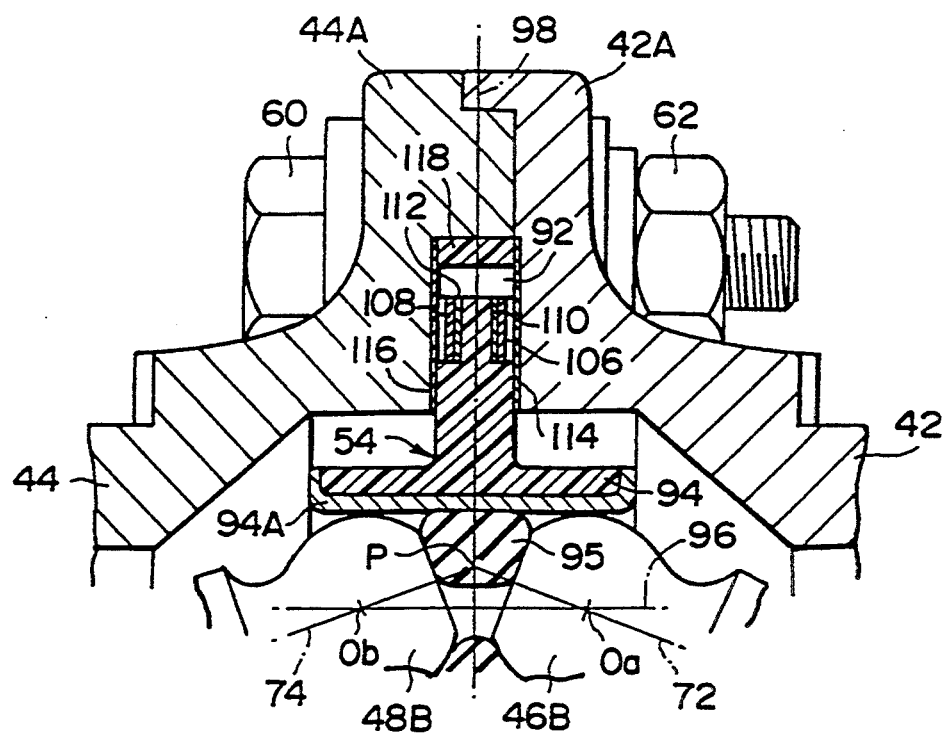
FIGS. 10–17 are views similar to FIG. 9, showing other embodiments.

In the variation embodiment shown in FIG. 10, the centering disk 54 is substantially made of a resin, except an inside annular portion of the socket portion 94 made of a metal tube member 94A integrally molded into the socket portion 94. This centering disk is formed by the resin so as to integrally include the resin layer portions 102 and 104 in the embodiment shown in FIG. 9. The structure shown in FIG. 10 is the same as that shown in FIG. 9 in other respects.

Figure 11:
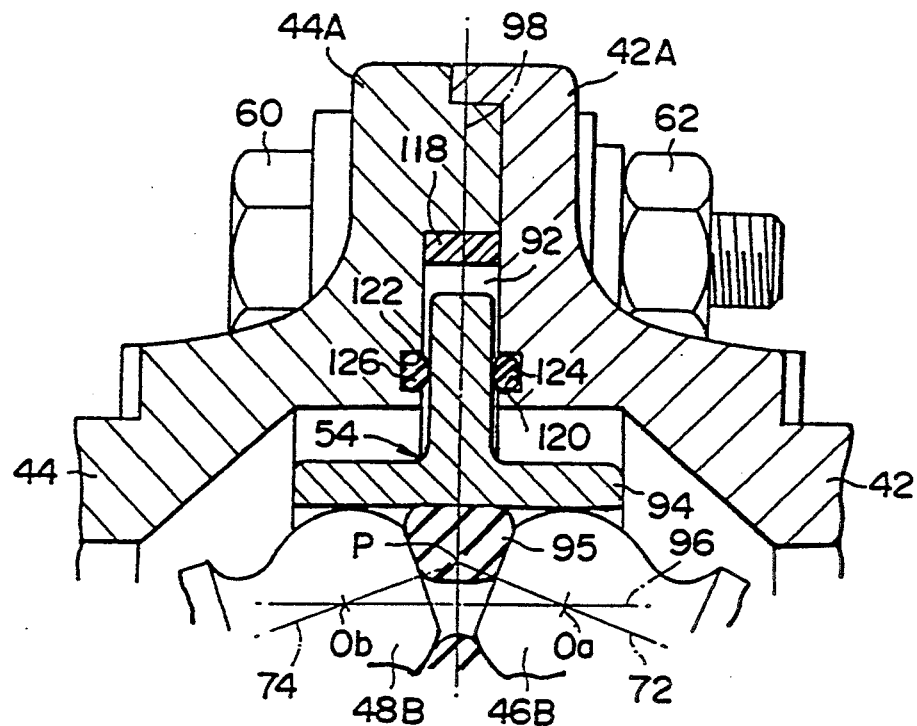

In the embodiment shown in FIG. 11, annular grooves 120 and 122 are provided in the opposite side walls of the annular groove 92, and rubber O-rings 124 and 126 are mounted in these annular grooves so as to provide pressing means for elastically biasing the annular peripheral portion of the centering disk 54 against the opposite side walls of the annular groove 92. The annular grooves 120 and 122 are centered about the common axis 56–58. The O-rings 124 and 126 operate in the same manner as the leaf springs 106 and 108 in the embodiments shown in FIGS. 9 and 10, elastically centering the centering disk 54 in the transverse direction relative to the annular groove 92.

Figure 12:
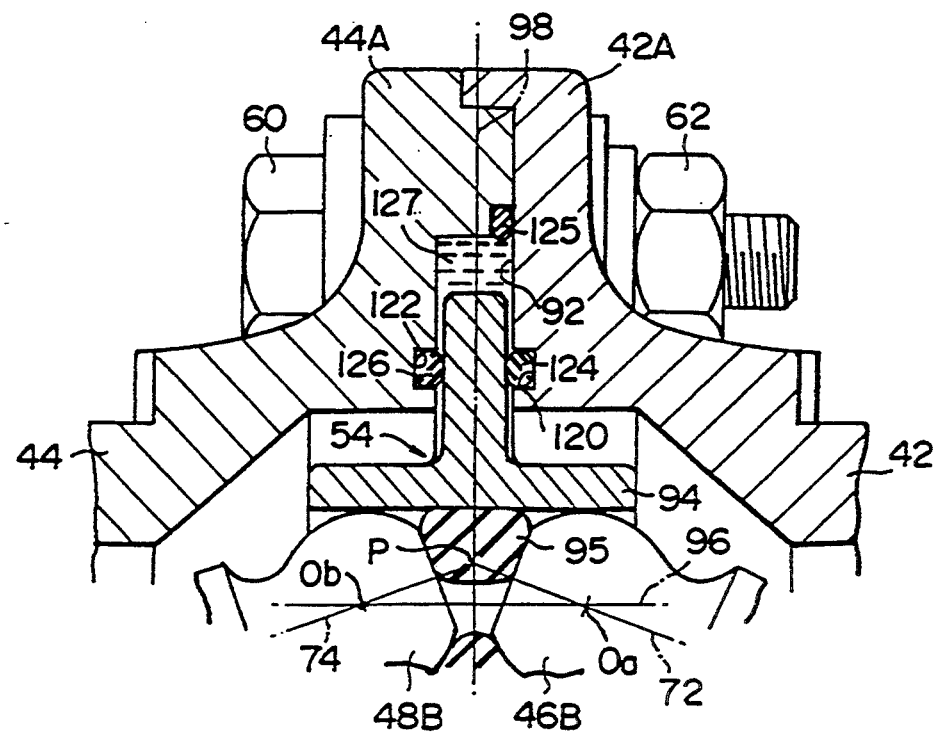

In the embodiment shown in FIG. 12, in addition to the annular grooves 120 and 122 and the O-rings 124 and 126 of the same type as those in the embodiment of FIG. 11, a rubber O-ring 125 is mounted along the mating faces of the flange portions 42A and 44A of the flange yokes 42 and 44. In this embodiment, no such ring as the ring 118 in the preceding embodiments is provided. Instead, a viscous fluid 127 such as oil is charged into the annular space of the annular groove 92 sealed by the O-rings 124, 125 and 126.

Although the O-rings 124 and 126 are mounted in the annular grooves 120 and 122 formed in the side wall portions of the annular groove 92 provided by the flange yokes 42 and 44, respectively, these O-rings may be mounted in annular grooves formed in the opposite side wall portions of the centering disk 54, though not shown in the figure.

Figure 13:
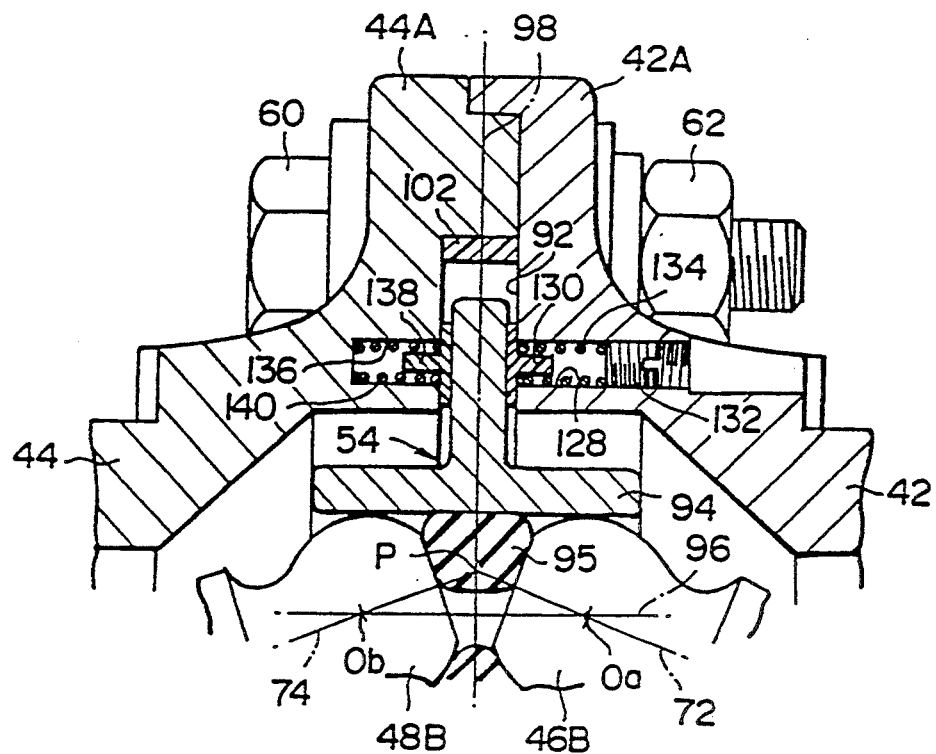

In the embodiment shown in FIG. 13, a plurality of bores 128 are formed in the flange portion 42A of the flange yoke 42 as spaced along the circumference thereof, each bore extending in parallel with the central axis 56. At the inside port of each bore 128 opening toward the annular groove 92, a mushroom shaped resin bush 130 is provided with its shaft portion inserted into the bore 128. An adjusting screw 132 is screwed into the other end of the bore 128. A compression coil spring 134 is mounted between the adjusting screw 132 and the head portion of the bush 130, whereby the bush is pressed at its head portion against the side wall portion of the centering disk 54.

A plurality of bores 136 are formed in the flange portion 44A of the flange yoke 44 at positions to align with the respective bores 128 also in parallel with the central axis 58. The bores 136 are closed at the inside ends thereof. At the port of each bore 136 opening toward the annular groove 92 a resin bush 138 of the same shape as the bush 130 is provided with its shaft portion being inserted into the bore. A compression coil spring 140 is mounted between the head portion of the bush 138 and the bottom of the bore 136, whereby the bush 138 is pressed at its head portion against the outer wall of the centering disk 54.

Although the adjusting screws 132 are provided only on the side of the flange yoke 42 in the shown embodiment, similar adjusting screws may be provided on the side of the flange yoke 44 so that the forces for biasing the bushes 130 and 138 against the opposite side walls of the centering disk 54 applied by the compression coil springs 134 and 140 are both adjustable.

Figure 14:
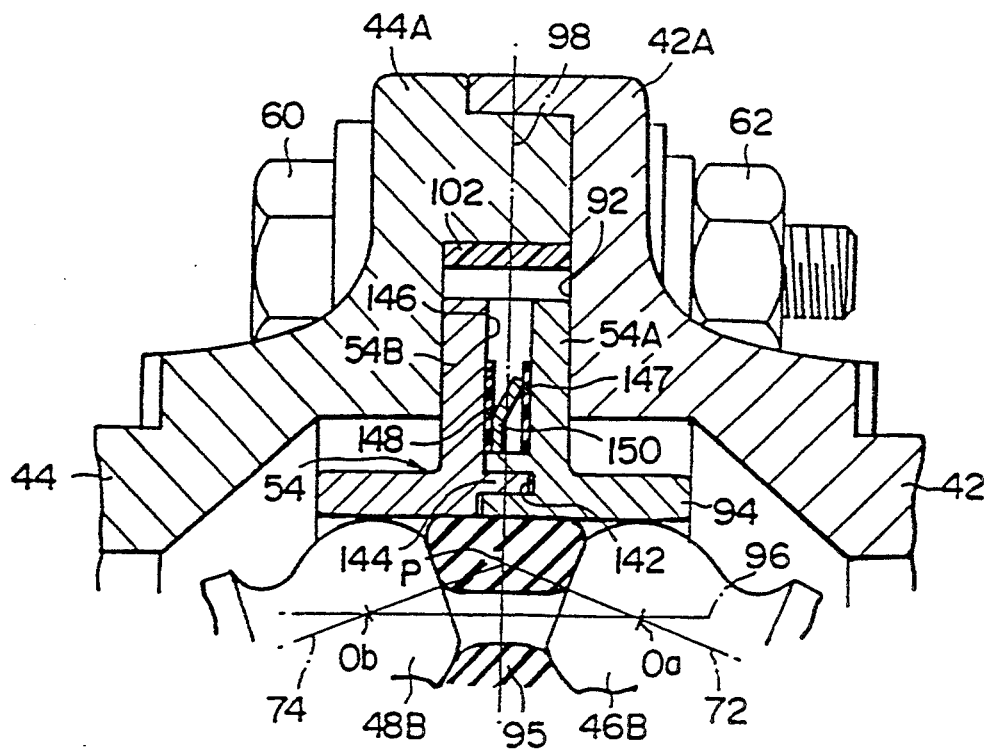

In the embodiment shown in FIG. 14, the centering disk 54 is made of a pair of disk halves 54A and 54B separated on opposite sides of the center plane 98. The disk half 54A is formed with an annular groove 142 centered about the central axis 56 at a side wall portion thereof facing the disk half 54B, while the disk half 54B is formed with an annular projection 144 adapted to slidingly engage into the annular groove 142 at a side wall portion thereof facing the disk half 54A, so that the two disk halves are assembled to form the centering disk in combination. The annular peripheral portions of the disk halves 54A and 54B define in combination an annular groove 146 opened toward radially outside. A pair of annular resin sheets 147 and 148 are provided in the annular groove 146 to be centered around the common axis 56–58, and a spring 150 is provided therebetween as also centered around the common axis 56–58, so as to operate as a pressing means for expanding the space between the resin annular sheets 147 and 148.

Figure 15:
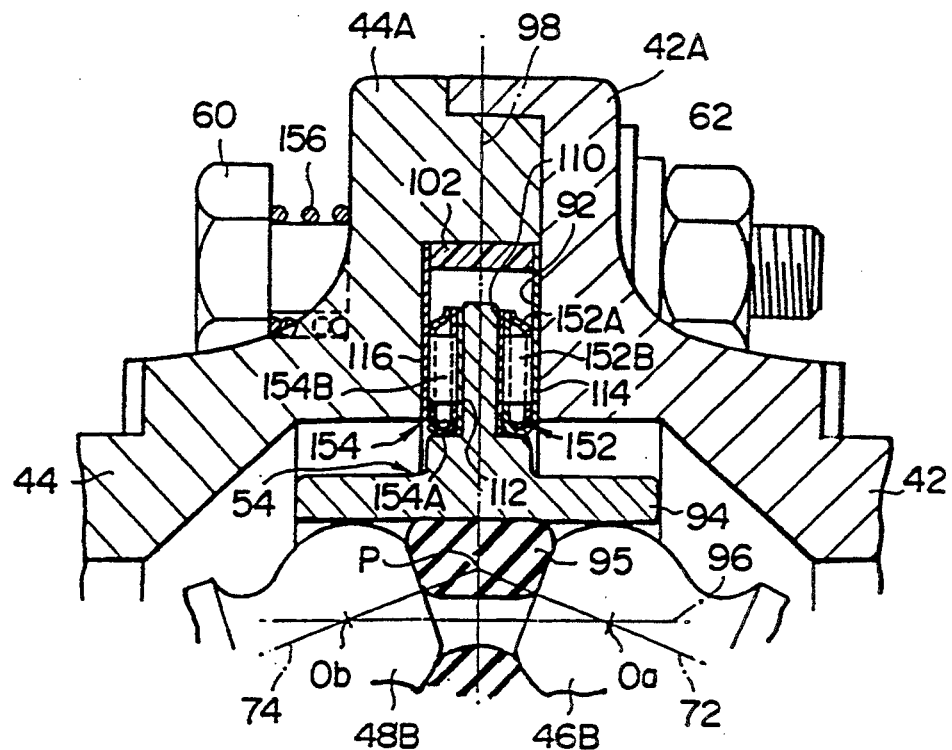

In the embodiment shown in FIG. 15, a thrust bearing 152 is provided between washers 110 and 114, while a thrust bearing 154 is provided between washers 112 and 116. The thrust bearings 152 and 154 comprise each pair of retainers 152A and 154A and each plurality of rollers 152B and 154B positioned by the respective pair of retainers. A compression coil spring 156 is mounted between the head portion of each bolt 60 and the flange portion 44A of the flange yoke 44. The thrust bearings 152 and 154 operate in combination with the coil springs 156 so that the outer peripheral portion of the centering disk 54 is elastically pressed between the opposite side walls of the annular groove 92 via the washers 110, 112, 114 and 116.

Figure 16:
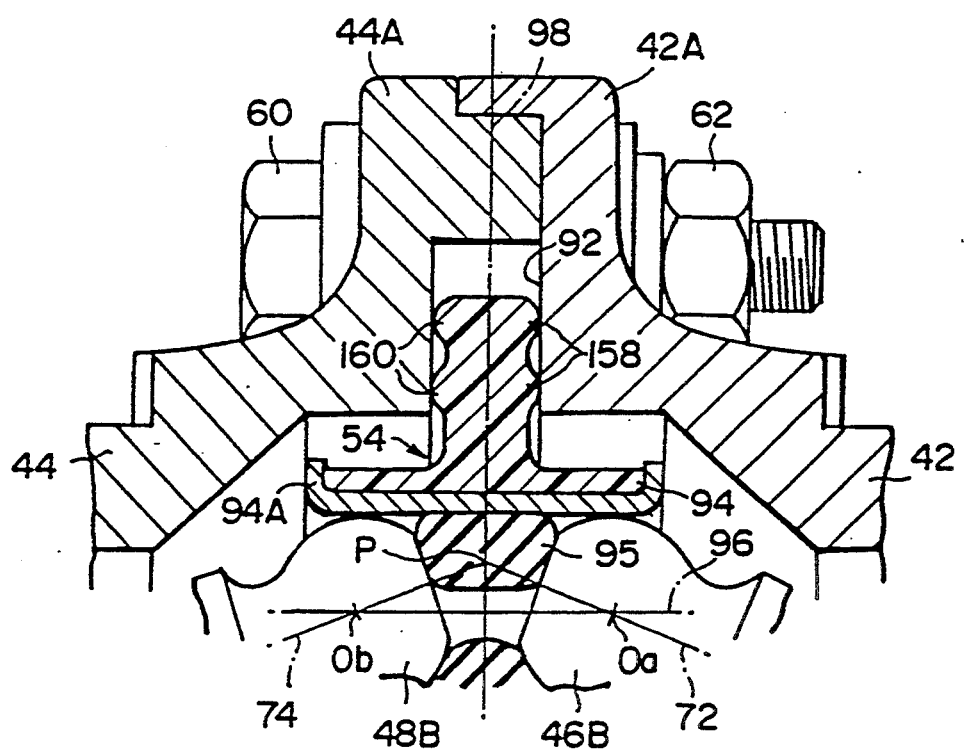

In the embodiment shown in FIG. 16, the centering disk 54 is substantially made of a resin as in the embodiment shown in FIG. 10 with a metal tube member 94A integrally molded therein to provide the inner cylindrical surface of the socket portion 94. The outer peripheral portion of the centering disk 54 is formed with two pairs of annular projections 158 and 160 centered about the central axis thereof. In a free state, the crest portions of the projections 158 and 160 are distant slightly more than the distance between the opposite side walls surfaces of the annular groove 92, so that the projections 158 and 160 are normally compressed in the axial direction between the opposite side walls of the annular groove 92, while the projections 158 and 160 are pressed against the opposite side walls of the annular groove 92 under the elasticity thereof. The projections 158 and 160 need not be continuous all through the circumference thereof but may be discontinuous to be a combination of a plurality of arcuate projections or a combination of a number of dot projections.

Figure 17:
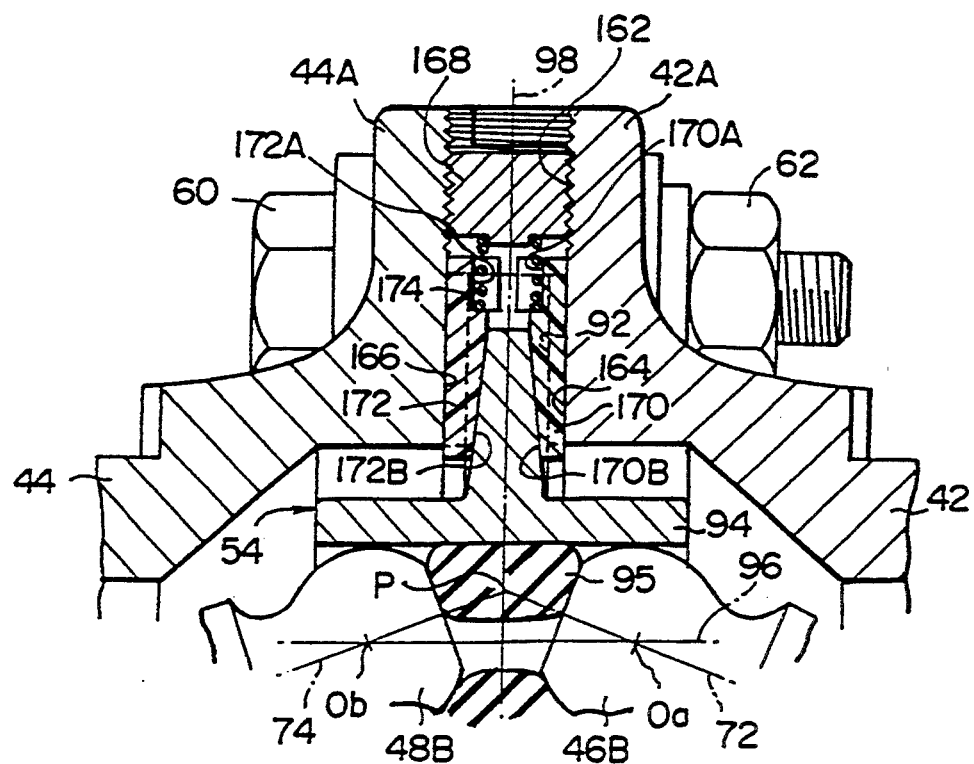
Figure 18:
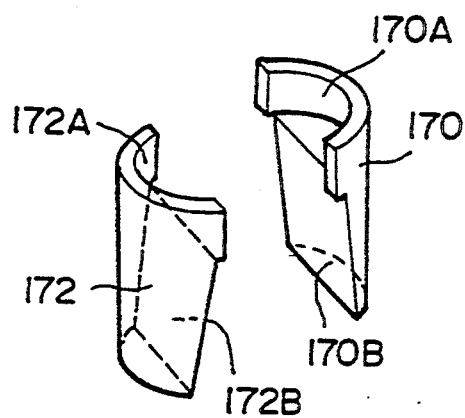
FIG. 18 is a perspective view of the wedge member incorporated in the construction of FIG. 17.

In the embodiment shown in FIG. 17, a plurality of threaded bores 162 are provided to radially traverse the annular web portion of the flange portion 44A of the flange yoke 44 extending along the outer circumference thereof, said plurality of threaded bores being spaced along the circumference of the flange portion 44A. In alignment with each threaded bore 162 there are formed arcuate grooves 164 and 166 in the flange portions 42A and 44A, respectively, so as to provide a substantially cylindrical bore forming a radially inside extension of the threaded bore 162. An adjusting screw 168 is screwed into each threaded bore 162. Half cylindrical bushes 170 and 172 made of a resin are inserted into the bore formed by the arcuate grooves 164 and 166 to be slidable in radial directions therein. A compression coil spring 174 is provided between the adjusting screw 168 and the bushes 170 and 172. As is shown in more detail in FIG. 18, arcuate recesses 170A and 172A are formed at radially outward end portions of the bushes 170 and 172, respectively, so as to form a cylindrical recess in combination for receiving the radially inside end of the compression coil spring 174. The outer peripheral portion of the centering disk 54 is reduced in its thickness gradually toward its outer peripheral edge so as to substantially closely contact with inclined faces 170B and 172B of the bushes 170 and 172. Thus, by the bushes 170 and 172 being biased radially inwardly by the compression coil spring 174, the inclined faces 170B and 172B are pressed against the inclined opposite surfaces of the centering disk 54. When the centering disk 54 shifts diametrically relative to the flange yokes 42 and 44 in accordance with the rotation of the joint, the change of the thickness of the outer peripheral portion of the centering disk is absorbed by a corresponding small shifting of the bushes 170 and 172 in the radial direction.

Figure 19:
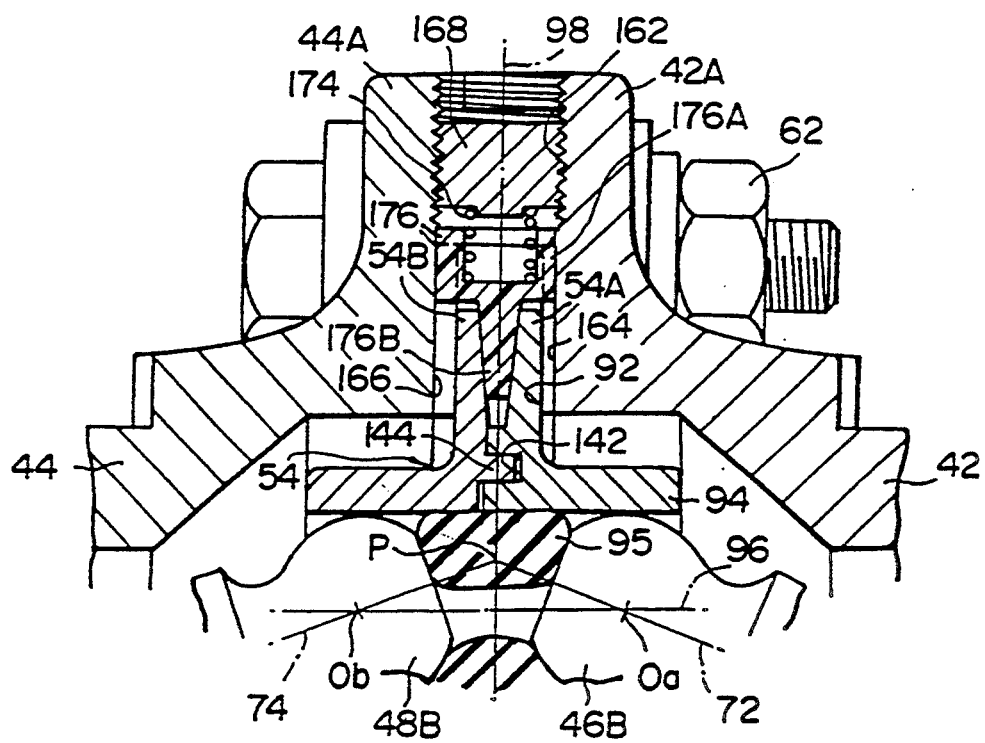
FIG. 19 is a view similar to FIG. 9, showing still another embodiment.
Figure 20:
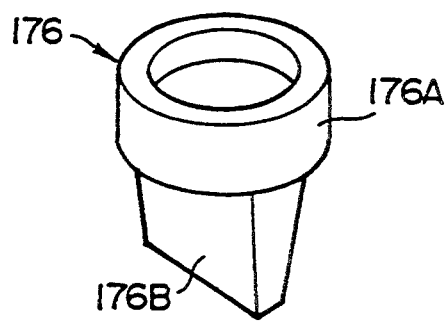
FIG. 20 is a perspective view of the wedge member incorporated in the construction of FIG. 19.

In the embodiment shown in FIG. 19, the centering disk 54 is formed as a combination of a pair of disk halves 54A and 54B divided along the center plane 98 as in the embodiment shown in FIG. 14. In this embodiment, however, the opposing wall surfaces of the pair of disk halves are inclined to define a V-shaped groove. In a bore defined by arcuate grooves 164 and 166 of the same construction as in the embodiment shown in FIG. 17, a wedge member 176 such as shown in FIG. 20 and having a cylindrical portion 176A and a wedge portion 176B is received at its cylindrical portion 176A to be movable in radial directions. In the same manner as in FIG. 17, a compression coil spring 174 is mounted between an adjusting screw 168 screwed into a threaded bore 162 and the wedge member 176, with the radially inside end of the spring being received in a cylindrical recess from in the cylindrical portion 176A of the wedge member. The wedge portion 176B of the wedge member has a tapered thickness toward the radially inside end thereof and is adapted to closely contact the inclined surfaces of the disk halves 54A and 54B at the opposite inclined surfaces thereof. Thus, by the wedge member 176 being biased radially inwardly by the compression coil spring 174, the disk halves 54A and 54B are biased to depart from one another so that the disk halves are pressed against the opposite side wall surfaces of the annular groove 92. When the centering disk 54 shifts in diametrical directions according to the rotation of the joint, the wedge member 176 also shifts in radial directions while applying the resilient force for biasing the disk halves in the mutually departing directions so that they are tightly pressed against the opposite side wall surfaces of the annular groove 92.

As a modification of the embodiment shown in FIG. 19, the centering disk 54 may be made of a material which allows for a small elastic deformation without being separated into the pair of disk halves 54A and 54B, so that the biasing force applied by the wedge member elastically deforms the outer peripheral portion of the centering disk to be pressed against the opposite side wall surfaces of the annular groove 92.

Figure 21:
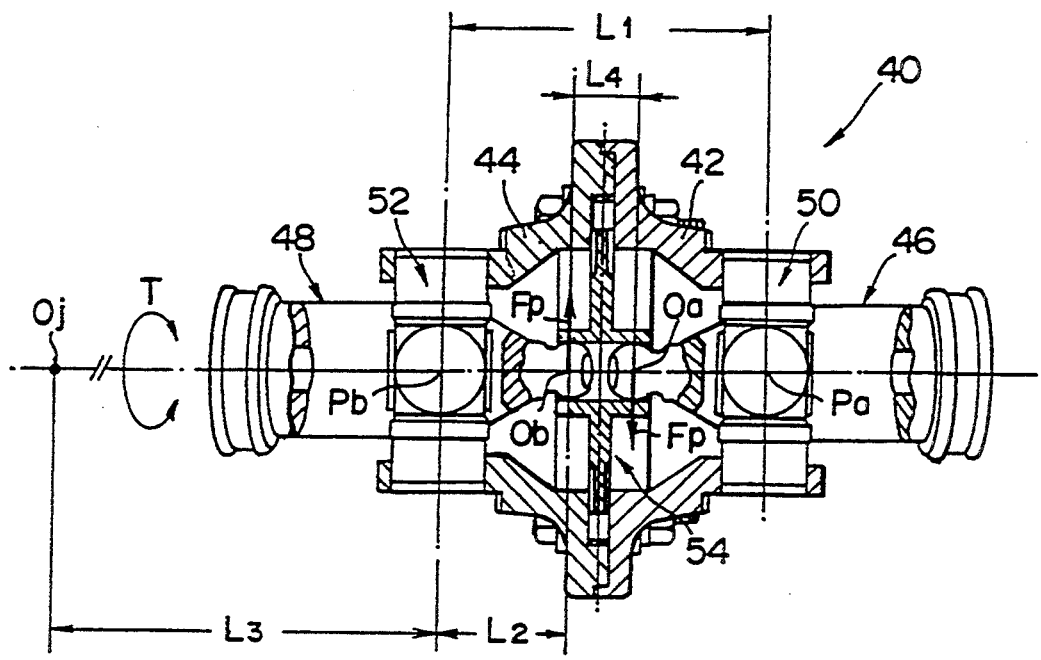
FIGS. 21 and 22 are sectional plan and side views of a constant velocity joint generally of the same construction as the joint shown in FIG. 7, for the purpose of operation analysis of the joint.
Figure 22:
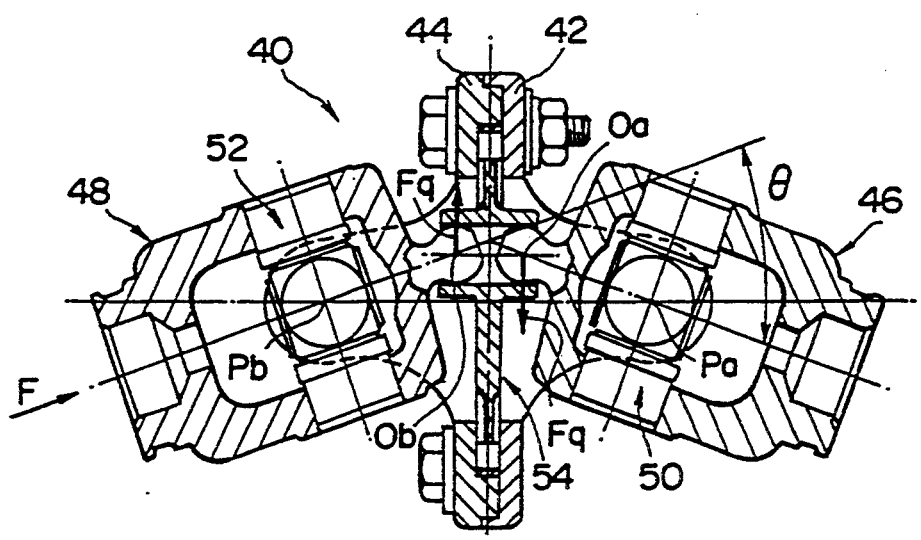

As can be appreciated from FIG. 21, when a force is inversely transmitted from the steering vehicle wheels through the steering system toward the constant velocity joint 40 so that a torque T is generated in the lower shaft 34 (see FIG. 1) the pair of spherical end portions 46B and 48B exert a couple of forces Fp to the socket portions of the centering disks 54, the couple of forces acting to turn the centering disk about an axis erected perpendicularly to the paper sheet of FIG. 21 through the point of intersection of the common axis 56–58 and the center plane 98. Due to such a couple of forces the corresponding outer peripheral portions of the centering disk are pressed against the corresponding side wall portions of the annular groove 92. On the other hand, when an axial force F is generated, as is illustrated in FIG. 22, in the lower shaft 34 by the force transmitted through the steering system from the steering vehicle wheels toward the constant velocity joint 40, the pair of spherical end portions 46B and 48B exert a couple of forces Fq to the socket portions of the centering disk 54, said couple of forces acting to turn the centering disk in the plane of the paper sheet of FIG. 22. Due to such a couple of forces the corresponding outer spherical portions of the centering disk are pressed against the corresponding side wall portions of the annular groove 92.

In FIG. 21, expressing the distance between the centers of the pair of cross pieces 50 and 52, i.e. points Pa and Pb, by $L_1$, the distance between the point Pb and the center Ob of the spherical end portion 48B by $L_2$, the distance between the point Pb and a center point Oj of the elastic joint 32 by $L_3$, and the distance between the center points Oa and Ob of the pair of spherical end portions 46B and 48B by $L_4$, the couples of forces Fp and Fq are expressed by the following formulae:

$$Fp=\{2L_3/(L_1L_2+L_1L^3-L_3L^4)\}\times T\sin(\Theta/2)$$
$$Fq=(L_3/L_2) F \sin(\Theta/2)$$

The magnitudes and directions of the couples of forces Fp and Fq change according to the magnitudes and directions of the torque T and the force F.

In the embodiments shown in FIGS. 7–16, the outer peripheral portion of the centering disk 54 is elastically centered against the opposite side walls of the annular groove 92 along the common axis 56–58 by the elastic compression means like the springs 106 and 108, while in the embodiments shown in FIGS. 17–20, the outer peripheral portion of the centering disk is elastically centered against the opposite side walls of the annular groove 92 by the compression coil springs 174 by way of the bushes 170 and 172, so that any clearance which would be generated between the annular peripheral portion of the centering disk and the opposite wall surfaces of the annular groove is absorbed. Further, the reaction force applied to the outer peripheral portion of the centering disk from the opposite side wall surfaces of the annular groove increases as the annular peripheral portion of the centering disk is shifted toward either of the opposite wall surfaces of the annular groove. Therefore, when an impulsive couple of forces is applied to the pair of spherical end portions 46B and 48B due to an impulsive torque or axial force inversely transmitted through the steering system from the steering vehicle wheels toward the constant velocity joint, there occurs no such action that the outer peripheral portion of the centering disk is struck against the side wall surfaces of the annular groove so as to generate a percussion noise. Particularly in the embodiments shown in FIGS. 7–9, the resin layers 102 and 104 are interposed between the outer peripheral portion of the centering disk and the opposite side walls of the annular groove, and in the embodiments shown in FIGS. 10 and 16, the centering disk itself is made of a resin, and therefore, in these embodiments, any impulsive striking between the outer peripheral portion of the centering disk and the side walls of the annular groove is more effectively suppressed.

In the embodiments shown in FIGS. 7–9, FIGS. 10–12, and FIGS. 14–16, the inside space of the annular groove 92 confined by the outer peripheral portion of the centering disk and the opposite side walls of the annular groove is substantially sealed off from the environment so that the invasion of foreign materials such as dusts into the annular groove is effectively prevented.

Figure 23:
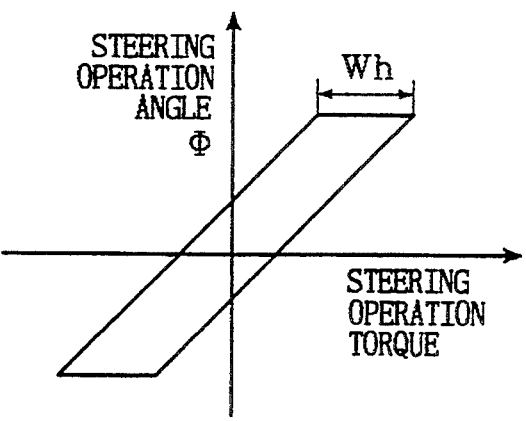
FIG. 23 is a diagram of steering operation torque versus steering operation angle.

Since the opposite side wall portions of the outer peripheral portion of the centering disk are elastically supported against the opposing side walls of the annular groove by the elastic means like the springs 106 and 108, even when the side wall surfaces of the outer peripheral portion of the centering disk and/or the side wall surfaces of the annular groove have worn, the change in the transverse dimensions due to the wearing is automatically compensated for by the elastic means, so that the precision quality of the constant velocity joint is not lost by the wearing of the sliding surfaces in the joint. Further, in the shown embodiments, since the elastic force acting between the annular peripheral portion of the centering disk and the side walls of the annular groove can be adjusted by the adjusting screws or the replacement of the fatigued springs, the precision quality of the joint can be maintained at low cost. By the incorporation of such adjustment means for the elastic supporting force between the annular peripheral portion and the side walls of the annular groove, the hysteresis performance of the joint is readily optimized. FIG. 23 is a diagram showing the relation between the steering operation torque and the steering operation angle, wherein Wh is the hysteresis of the steering system. It is well known that there is an optimum magnitude with respect to Wh to obtain the most desirable steering quality. By an adjustment of the springs 106 and 108 by the adjusting screws or an appropriate selection of such springs, it is possible to obtain such a most desirable steering quality without the troublesome adjustment of the preloading of the rack bar of the steering block which needs particular measuring devices or other complicated adjustment procedures.

When the elastic joint 32 is provided between the pinion gear shaft 30 and the lower shaft 34 as shown in FIG. 1, the torsional rigidity of the steering system is limited at a relatively low value, and therefore, if the preloading of the rack bar is set high for a compensation therefor, the rate of increase of the hysteresis Wh lowers.

Figure 24:
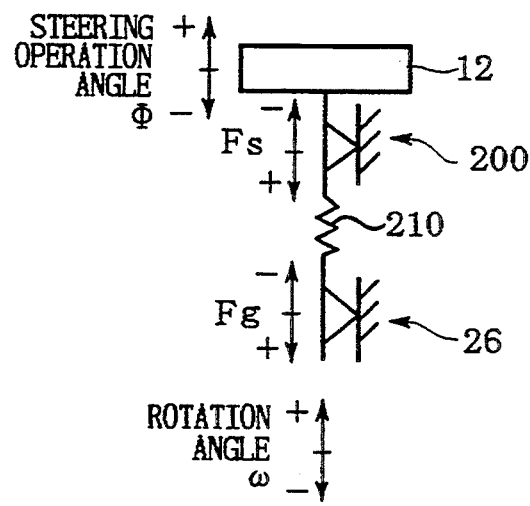
FIG. 24 is a schematic illustration of the steering system for the purpose of operation analysis.

In more detail, referring to FIG. 24 showing a steering system in a schema, 200 represents a steering system including the upper shaft 10, the constant velocity joint 40 and the lower shaft 34 of the above described embodiments, 210 represents an elastic portion of the steering system principally provided by the elastic joint 32, Fs shows a friction force in the steering system, and Fg shows a friction force in the steering gear box. FIG. 25 shows the relation between the steering operation angle $\phi$ at the steering wheel 12 and the rotation angle $\omega$ of the steering gear box 26 (pinion gear shaft) and the magnitude of hysteresis Whs in the steering system between the steering gear box and the steering wheel.

As is understood from FIG. 24, when the steering wheel is rotated, since the pinion gear shaft of the steering gear box does not rotate until the force transmitted through the elastic portion 210 increases above the friction force Fg, there exists a non reactive region N in the rotation angle $\omega$ of the steering gear box. The maximum steering angle $\phi$ max of the non reactive region N is given by $$\phi \max=Fg/E$$

wherein E is the torsional rigidity of the steering system, so that it is determined by the friction force Fg of the steering gear box and the torsional rigidity of the steering system. Therefore, as is shown in FIG. 25, an increase of the preloading of the rack bar which increases the friction force Fg in the steering gear box shifts the performance line from the solid line to the phantom line, whereby the non reactive region N is increased, thereby correspondingly increasing the range M in which the hysteresis of the steering system does not change. Therefore, at a steering angle greater than $\phi$ max, the increase of the hysteresis according to increase of steering angle is reduced as much as the hatched portion in FIG. 25.

Therefore, in the steering system including the elastic joint 32 in which the torsional rigidity of the steering system is limited, it is desirable that the increase of the hysteresis is made by increasing the friction force Fs in the steering system and not by increasing the friction force Fg in the steering gear box. In the steering system shown in FIG. 1, the friction force in the steering system can be readily optionally adjusted by the adjustment of the friction force at the sliding contact between the annular peripheral portion of the centering disk and the side wall portions of the annular groove at high accuracy, because the relative rotation therebetween is definitely determined by the eccentric shifting of the socket portion from the diametrical center of the centering disk.

Further, according to the experimental researches conducted by the inventors, the increasing rate of the hysteresis due to the increase of the preloading of the rack bar and the increase of the friction force in the ball joint of the suspension decreases as the vehicle speed increases, while the friction force in the steering system mostly available by the friction force in the constant velocity joint is substantially constant when the constant velocity joint according to the present invention is incorporated. Therefore, according to the present invention, the steering quality during high speed running of the vehicle is also improved as compared with the case where the conventional constant velocity joint is used.

FIGS. 26–30 show several embodiments which are the modifications of the basic embodiment of the present invention shown in FIGS. 2–5 in respect of softening the contact between the outer peripheral edge of the centering disk 54 and the bottom of the annular groove 92, so as to avoid the above-mentioned percussion noise and/or unpleasant steering feeling.

Figure 26:
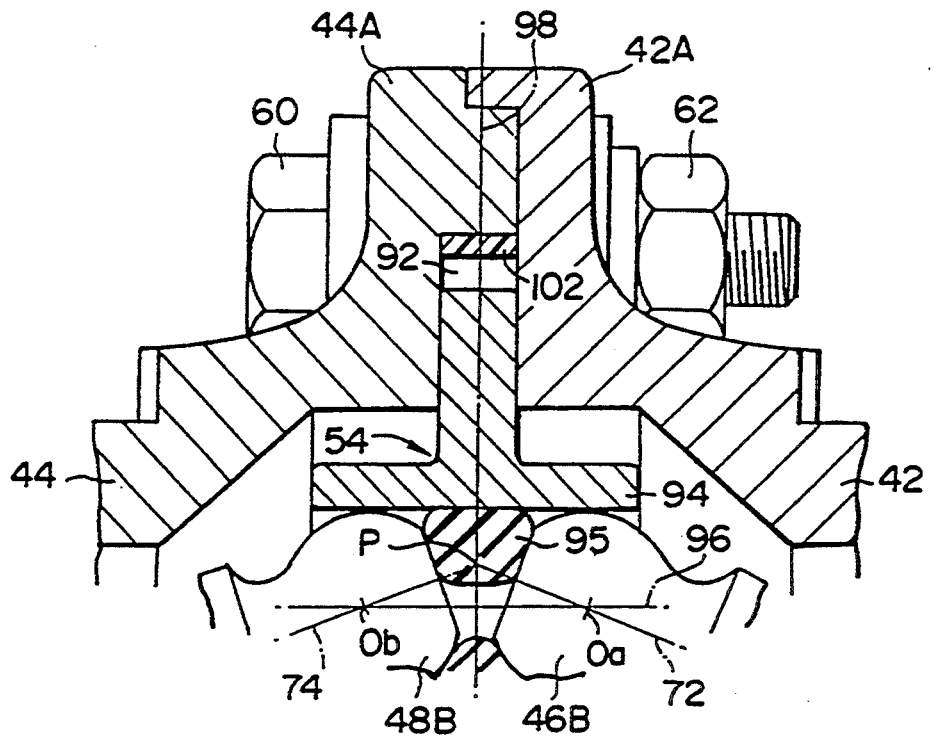
FIGS. 26–29 are views similar to FIG. 9, showing other embodiments modified from the embodiment of FIGS. 2–5.

In the modification embodiment shown in FIG. 26, a damping ring 102 made of a soft material such as resin, felt or the like is mounted along the bottom of the annular groove 102.

Figure 27:
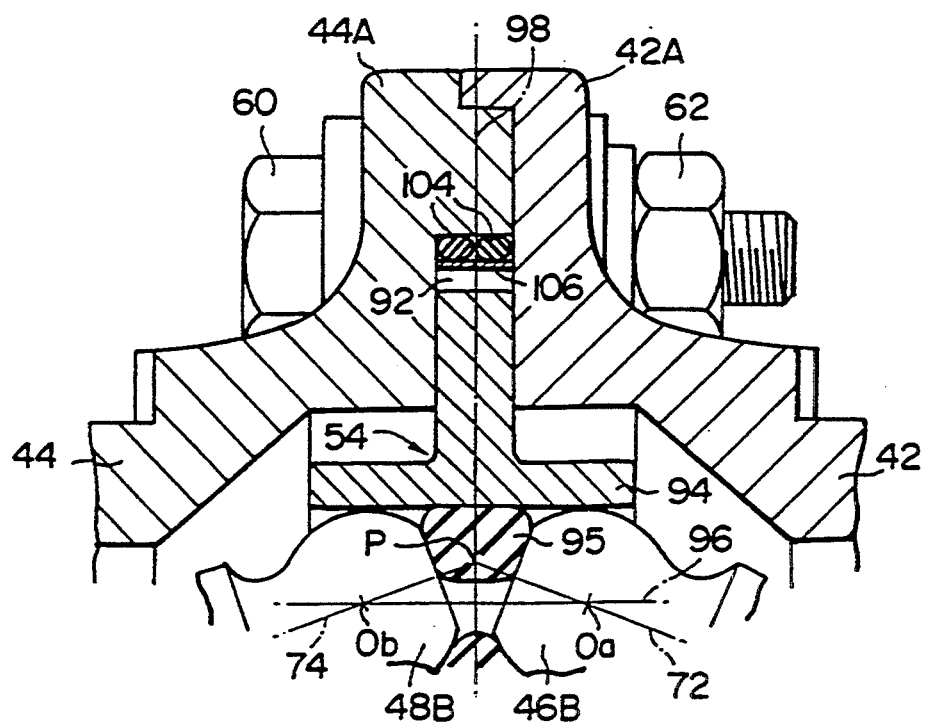

In the modification embodiment shown in FIG. 27, a pair of O-rings 104 made of rubber are mounted along the bottom of the annular groove 92 with a covering metal ring 106 for improving the slidability between the outer peripheral edge of the centering disk and the cushioning layer provided by the pair of O-rings. The pair of O-rings may be replaced by a single cylindrical rubber ring.

Figure 28:
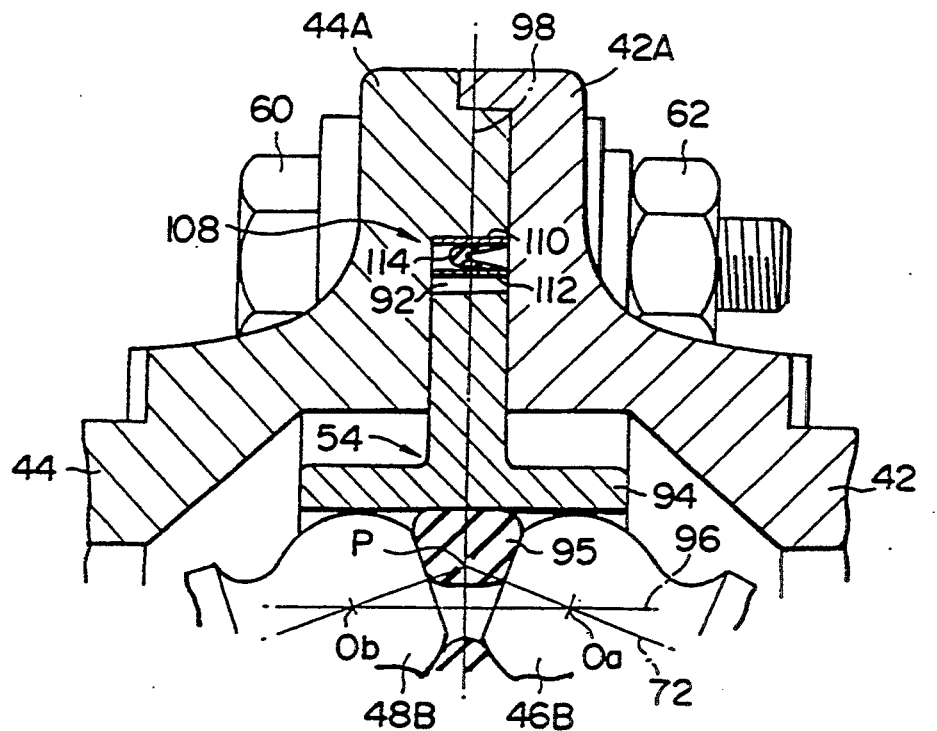

In the modification embodiment shown in FIG. 28, an annular cushion assembly 108 is mounted along the bottom of the annular groove 92. The annular cushion assembly is made of a metal outer ring 110, a metal inner ring 112 and a rubber ring 114 of a U-shaped cross section having opposite leg portions bound with the outer and inner rings by vulcanization. However, the rubber ring 114 may be replaced by an annular spring made of a spring steel or the like to have an appropriate cross sectional construction to provide a spring function in the radial directions.

Figure 29:
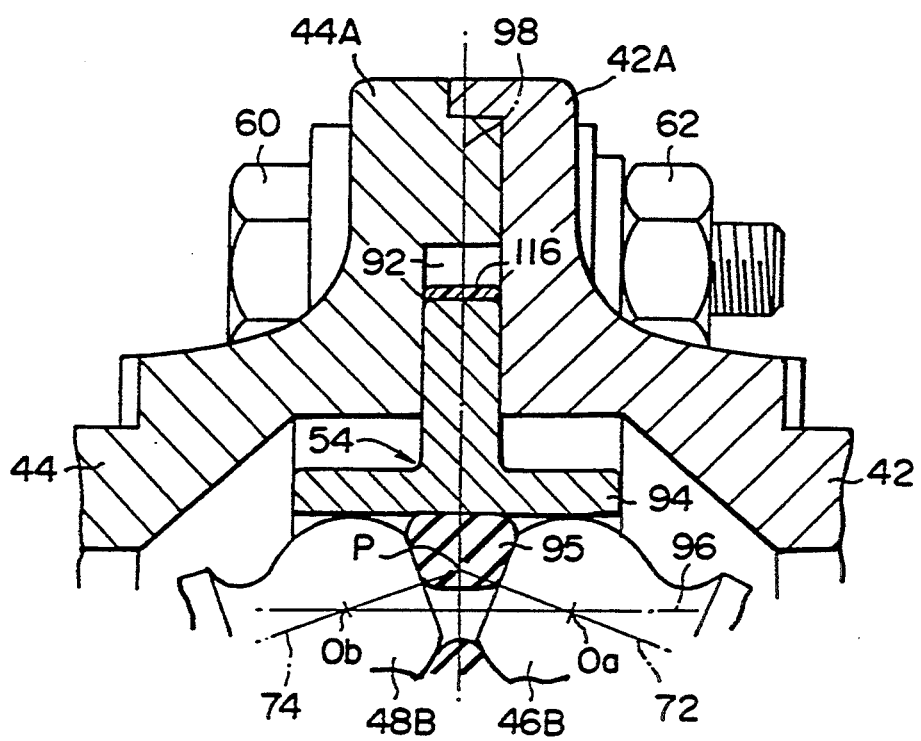

In the modification embodiment shown in FIG. 29, a cylindrical ring 116 made of a soft material such as resin, felt or the like is mounted along the outer periphery of the centering disk 54.

Figure 6:
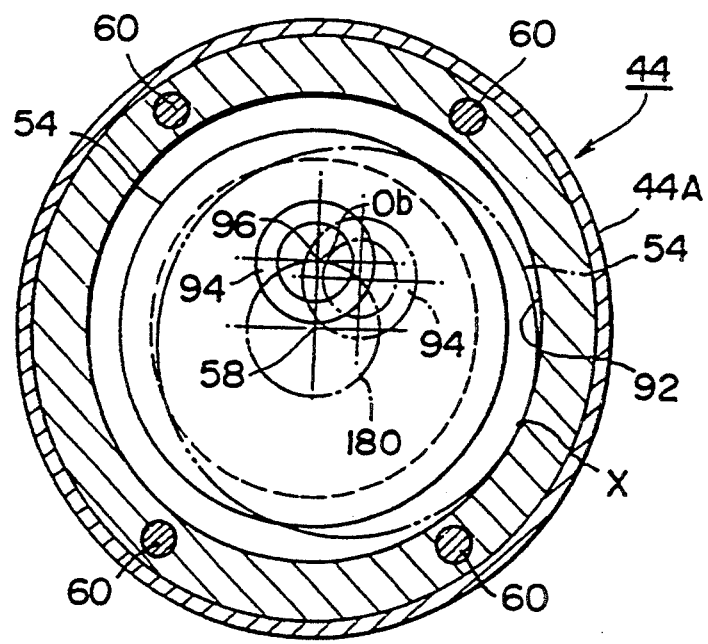
FIG. 6 is a transverse sectional view similar to FIG. 4, showing the contact between the centering disk and the bottom of the annular groove.
Figure 30:
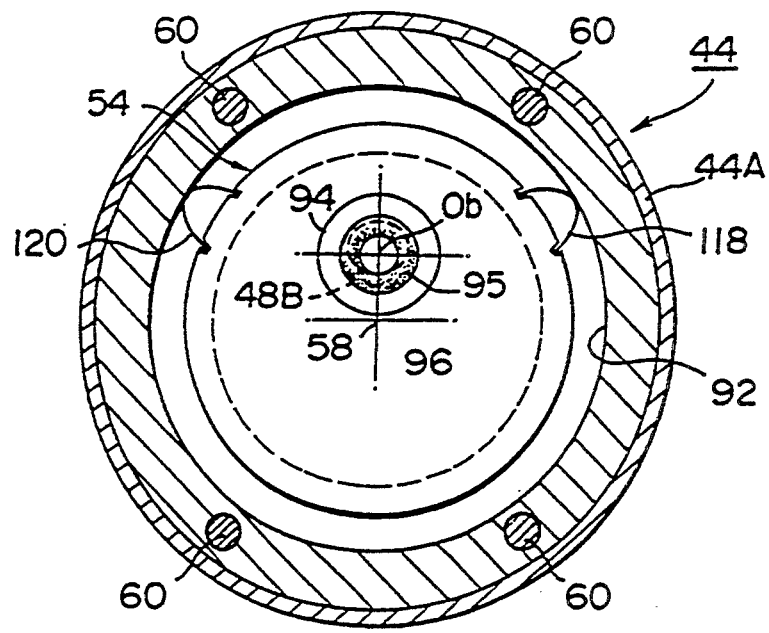
FIG. 30 is a view similar to FIG. 4, showing still another embodiment modified from the embodiment of FIGS. 2–5.

In the modification embodiment shown in FIG. 30, a pair of arcuate leaf springs 118 and 120 are mounted to the outer periphery of the centering disk 54 at two spaced positions with each opposite ends being received in a pair of grooves formed in the outer periphery of the centering disk, so that each of these leaf springs elastically damps the swinging movement of the centering disk 54 at the moment when the contact between the outer peripheral edge of the centering disk 54 and the bottom of the annular groove occurs at the point X described with reference to FIG. 6 or the point symmetrical thereto.

Figure 4:
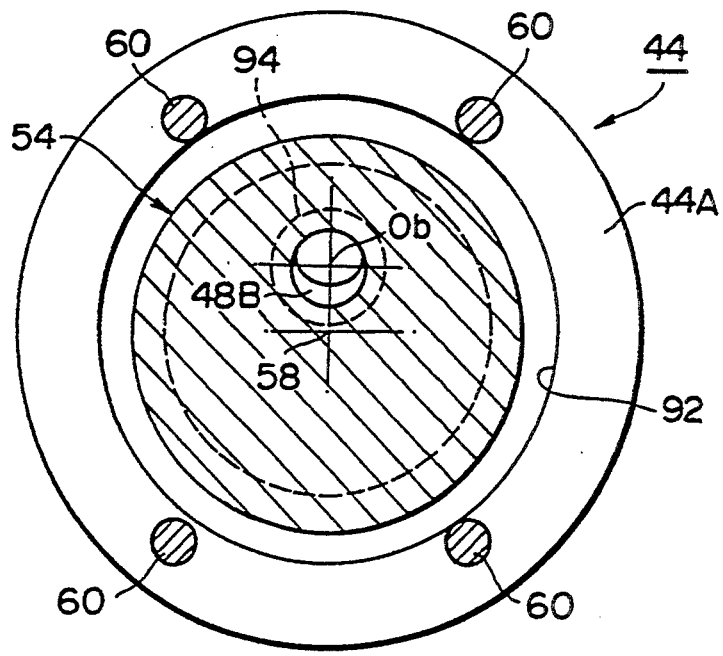
FIG. 4 is a transverse sectional view along line IV—IV in FIG. 2.
Figure 5:
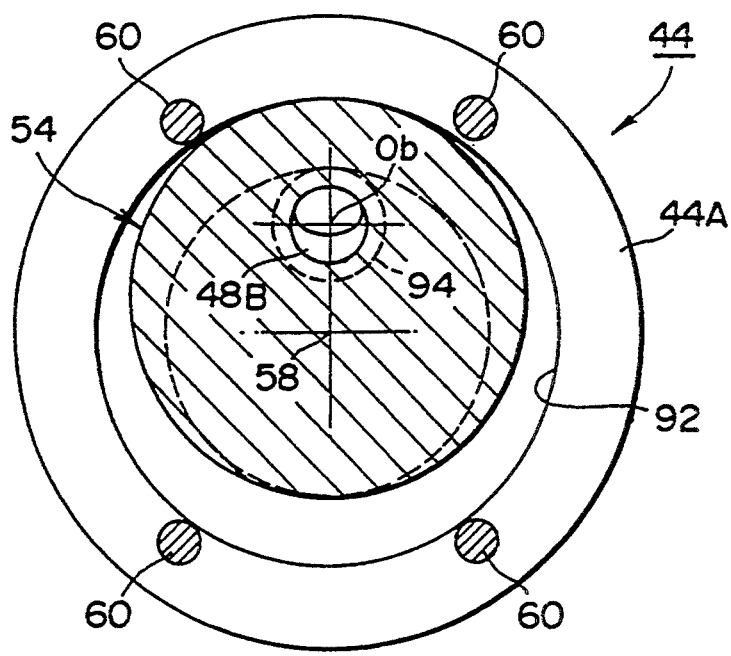
FIG. 5 is a transverse sectional view along line V—V in FIG. 3.
Figure 32:
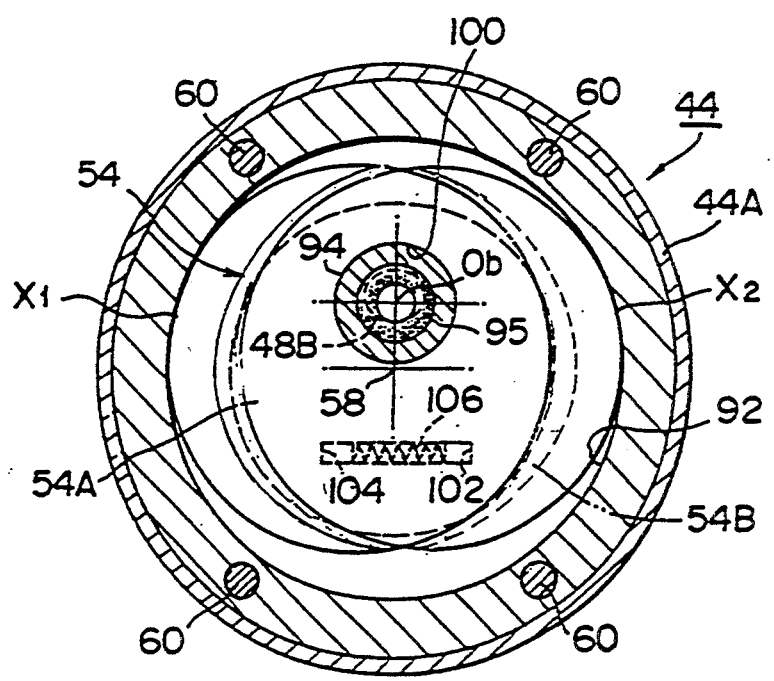
FIG. 32 is a view according to line XXXII—XXXII in FIG. 31.
Figure 31:
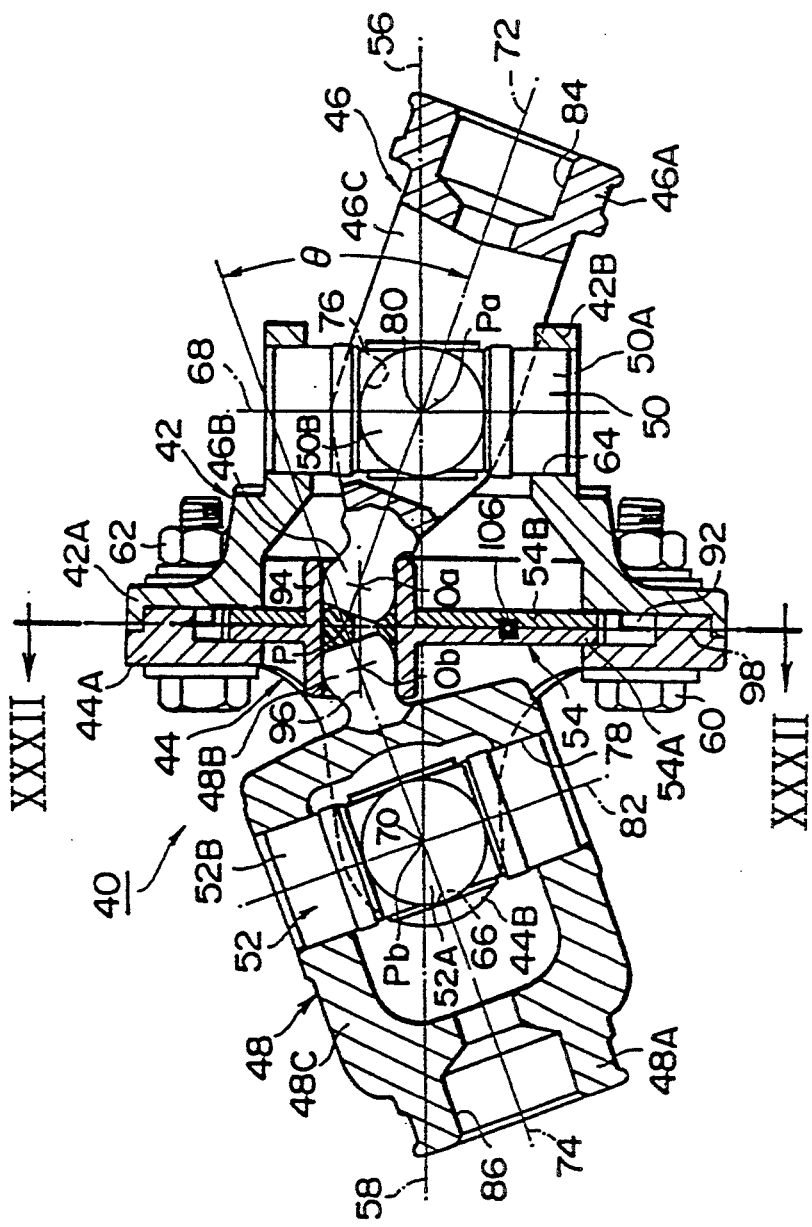
FIG. 31 is a view similar to FIG. 2, showing still another embodiment.

FIGS. 31 and 32 are longitudinal and transverse sectional views similar to FIGS. 2 and 4, showing a further embodiment of the present invention improved in respect of avoiding the above-mentioned percussion noise and/or unpleasant steering feeling. In this embodiment, the centering disk generally designated by 54 is comprised of a first disk member 54A bearing the socket portion 94 and a second disk member 54B laid over the first disk member 54A to receive the socket portion 94 in its opening 100. Each of the disk members 54A and 54B is reduced of its thickness to a half of the full thickness of the centering disk 54 at its mutually overlapping portion, except its non overlapping crescent portion, and the two disk half members are biased relative to one another to expand to the state shown in FIG. 32 by a compression coil spring 106 mounted in a cylindrical groove formed by half cylindrical grooves 102 and 104 formed in the disk members 54A and 54B at their mating faces, so that the disk member 54A contacts the bottom of the annular groove 92 at point $X_1$, while the disk member 54B contact the bottom of the annular groove 92 at point $X_2$. In this construction, the centering disk 54 is, as a whole, always in contact with the bottom of the annular groove 92, and therefore no new contact between the centering disk and the bottom of the annular groove to cause the above-mentioned percussion noise and/or unpleasant steering feeling occurs regardless of changes of direction of torque applied to the joint.

Although the invention has been described in .detail with respect to some preferred embodiments thereof, it will be apparent to those skilled in the art that various modifications are possible with respect to the shown embodiments without departing from the spirit of the present invention.

We claim:

1. A constant velocity joint, comprising:

a pair of flange yokes each having an annular flange portion and a pair of arm portions and connected together at said flange portions to define a radially inwardly open annular groove therebetween;

a pair of pin yokes each having a connection end portion, a spherical end portion and a pair of arm portions connecting said connection end portion and said spherical end portion;

a pair of cross pieces each having a pair of stub portions crossing one another, one said pair of stub portions pivotally connecting said pair of arm portions of each one of said flange yokes and the other said pair of stub portions pivotally connecting said pair of arm portions of each one of said pin yokes so as to form a universal joint; and a centering disk comprising a one piece disk part having a peripheral portion thereof slidably received in said annular groove and a socket portion spaced from a diametrical center of said disk for receiving said spherical end portions of said pair of pin yokes, said one piece disk part being constructed and arranged to be movable within said annular groove to change the position of said socket portion relative to said annular groove while continuously maintaining the entire peripheral portion thereof within said annular groove.

2. A constant velocity joint according to claim 1, wherein an annular cushion layer is provided along a bottom of said annular groove.

3. A constant velocity joint according to claim 2, wherein said annular cushion layer comprises a resin ring.

4. A constant velocity joint according to claim 2, wherein said annular cushion layer comprises a resin ring and a metal ring provided at the radially inside of said resin ring.

5. A constant velocity joint according to claim 2, wherein said annular cushion layer comprises at least one rubber O-ring and a metal ring provided at the radially inside of said O-ring.

6. A constant velocity joint according to claim 2, wherein said annular cushion layer comprises an annular spring means having a sectional construction to provide a radial spring action and a metal ring provided at the radially inside of said annular spring.

7. A constant velocity joint according to claim 2, wherein said annular cushion layer comprises a layer of viscous fluid.

8. A constant velocity joint according to claim 1, wherein an annular cushion layer is provided along an outer periphery of said centering disk.

9. A constant velocity joint according to claim 8, wherein said annular cushion layer comprises a resin ring.

10. A constant velocity joint according to claim 1, wherein a pair of elastic compression layers are provided between opposite side surfaces of said centering disk and opposite side wall surfaces of said annular groove.

11. A constant velocity joint according to claim 10, wherein said elastic compression layers comprise leaf springs each provided between the side surface of said centering disk and the mating side wall surface of said annular groove.

12. A constant velocity joint according to claim 10, wherein said elastic compression layers comprise rubber O-rings each provided between the side surface of said centering disk and the mating side wall surface of said annular groove.

13. A constant velocity joint according to claim 10, wherein said elastic compression layers comprise compression coil springs each received in a bore formed in a side wall portion of said annular groove to extend transversely to the side wall surface of said annular groove and a bush member provided between an end of said compression coil spring and the mating side surface of said centering disk.

14. A constant velocity joint according to claim 13, wherein an adjusting screw is provided to adjust the spring force of said compression coil spring.

15. A constant velocity joint according to claim 10, wherein said elastic compression layers comprise a pair of thrust bearings.

16. A constant velocity joint according to claim 10, wherein said elastic compression layers comprise a wedge member and a radial compression coil spring biasing said wedge member in a radial direction of increasing a compression force acting between the side surface of said centering disk and the mating side wall surface of said annular groove due to a wedging action of said wedge member.

17. A constant velocity joint according to claim 1, wherein said centering disk is formed as a combination of disk part halves each having a side wall surface contacting a mating side wall surface of said annular groove, and an elastic compression means is provided between said disk halves so as to elastically expand said disk part halves toward respective mating side wall surfaces of said annular groove.

18. A constant velocity joint according to claim 17, wherein said elastic compression means comprises a wedge member and a radial compression coil spring biasing said wedge member in a radial direction of increasing a compression force acting between the side surface of said centering disk and the mating side wall surface of said annular groove due to a wedging action of said wedge member.

19. A constant velocity joint according to claim 1, wherein said centering disk includes an elastically compressed portion elastically contacting the opposite side wall surfaces of said annular groove under the elasticity of itself.

20. A constant velocity joint according to claim 1, wherein said centering disk is formed as a combination of disk part halves partially overlapped over one another so as to be sidewardly expandable to turn around a center of said socket portion relative to one another, and a biasing means biasing said disk part halves toward an expanded condition.

21. A constant velocity joint according to claim 1, wherein a spring means is provided at an outer peripheral portion of said centering disk to elastically abut against a bottom of said annular groove when said centering disk turns around a center of said socket portion relative to said flange yokes.

* * * * *